US007599762B2

(12) United States Patent
Discenzo et al.

(10) Patent No.: US 7,599,762 B2
(45) Date of Patent: Oct. 6, 2009

(54) MODEL-BASED CONTROL FOR CRANE CONTROL AND UNDERWAY REPLENISHMENT

(75) Inventors: Frederick M. Discenzo, Brecksville, OH (US); Charles Daniel Grucella, Akron, OH (US); Kenneth A. Loparo, Chesterland, OH (US)

(73) Assignee: Rockwell Automatino Technologies, Inc., Mayfield Heights, OH (US)

( * ) Notice: Subject to any disclaimer, the term of this patent is extended or adjusted under 35 U.S.C. 154(b) by 834 days.

(21) Appl. No.: 11/210,348

(22) Filed: Aug. 24, 2005

(65) Prior Publication Data

US 2007/0050115 A1 Mar. 1, 2007

(51) Int. Cl.
*G06F 7/00* (2006.01)

(52) U.S. Cl. .......................................................... 701/1

(58) Field of Classification Search ..................... 701/1, 701/50

See application file for complete search history.

(56) References Cited

U.S. PATENT DOCUMENTS

| | | | | |
|---|---|---|---|---|
| 4,753,357 | A | 6/1988 | Miyoshi et al. | |
| 5,443,566 | A | 8/1995 | Rushmer et al. | |
| 5,526,946 | A | 6/1996 | Overton | |
| 6,135,301 | A * | 10/2000 | Monzen et al. | 212/275 |
| 6,439,407 | B1 | 8/2002 | Jacoff et al. | |
| 6,588,610 | B2 | 7/2003 | Ong et al. | |
| 6,631,300 | B1 | 10/2003 | Nayfeh et al. | |
| 6,644,486 | B2 | 11/2003 | Jacoff et al. | |
| 6,648,156 | B1 | 11/2003 | Bryfors et al. | |
| 6,931,314 | B2 | 8/2005 | Holland et al. | |
| 7,121,012 | B2 * | 10/2006 | Voecks | 33/345 |
| 2004/0015264 | A1 | 1/2004 | Holland et al. | |

FOREIGN PATENT DOCUMENTS

| | | | |
|---|---|---|---|
| JP | 01285586 | A | 11/1989 |
| JP | 2001048467 | A | 2/2001 |

OTHER PUBLICATIONS

European Search Report for European Patent Application No. EP06017665, mailed Jul. 4, 2008, 8 pages.

* cited by examiner

*Primary Examiner*—Yonel Beaulieu
(74) *Attorney, Agent, or Firm*—Turocy & Watson LLP; William R. Walbrun

(57) ABSTRACT

Crane control and anti-sway are facilitated utilizing a diagnostic component that includes a model component and a control component. The diagnostic component interfaces with an extrinsic data analysis component and a controller component. The diagnostic component receives operating condition information from the extrinsic data analysis component and performs predictive modeling, based on a current status and stored information. Further, the diagnostic component predicts the affect of the operating conditions on a crane and implements and/or recommends actions to mitigate the affect of the existing and/or predicted operating conditions. The diagnostic component further mitigates crane sway and/or induces crane sway to reduce container transit time. Intelligent agents are employed to provide trajectory planning and execution and/or to detect potential component failure.

16 Claims, 15 Drawing Sheets

MODEL-BASED CONTROL FOR CRANE CONTROL AND UNDERWAY REPLENISHMENT

TECHNICAL FIELD

The following description relates generally to crane control, and more particularly to a model-based control for container cranes and underway replenishment.

BACKGROUND OF THE INVENTION

Cranes are utilized to lift and transport machinery, products, goods, containers, and other heavy objects within factories and warehouses and to transfer the products to trucks, trains, and/or ships for transportation purposes. A major problem with the movement of products by crane is cable sway that may develop while the product is being transported. When moving a container, for example, to a final destination (position), such as over a tractor-trailer, the container cannot be swinging back and forth. Thus, when the container is placed in location, the cable sway must be essentially eliminated for proper placement of the container. This results in acceleration and deceleration constraints while moving the container to mitigate sway during movement and more importantly at the end location. Additionally, if the swaying motion is not brought under control it may result in a disastrous situation resulting in damage to the container, products, ship, vehicle, crane, dock, or injury to personnel.

Generally, anti-sway control is implemented in a manual or semi-automatic manner by the operator altering the control (e.g. acceleration) of the crane to eliminate sway on lifting and set-down and at the end of travel. Typically, an experienced operator manually controls speed and acceleration to avoid container collisions and provide essentially zero sway upon reaching the container destination, which allows the container to be placed rather quickly. However, in the case of an unskilled operator, the operator must wait for the swaying to stop before lowering the container into the designated location. In the case of an inexperienced operator, the waiting period can add as much as thirty percent to the cycle time to move the goods, resulting in lost productivity and increased costs. This time becomes especially costly in sea transport because when a ship is at port longer than necessary due to the increase in movement time it results in additional demurrage charges. Furthermore, delays during loading and unloading operations can tie up limited docking space and prevent other ships from docking and carrying out loading and/or unloading activities. Prolonged sway also creates a greater hazard of the container and spreader striking objects and/or personnel, resulting in a more dangerous condition than if the container sway is controlled.

Container cranes utilized to load and unload containers from ships typically have a horizontal beam that supports a movable trolley. Attached to the trolley and suspended by cables is a hook or spreader that attaches to a container. The container may be empty or it may be heavy with shipped goods. The spreader is lowered over the container and the spreader locks grab onto the four corners of the container. The spreader is now attached to the container and raises the container allowing for clearance of other containers, ship structural components, personnel, etc. The container is brought shore side, for example and placed on the ground or on a truck. The operator has full control of the container in the two dimensional plane of movement. When riding in the cab attached to the trolley, the operator looks down though a window in the floor of the cab and positions the container/spreader. The operator controls raising, lowering, and horizontal travel and guides the container to/from the ship. The constraints here include motor power and braking power as set by drive limits, mechanical and structural load limits, and acceleration/deceleration limits such that the operator must survive transit and not become injured or excessively fatigued.

Underway replenishment, or ship-to-ship transfer on the open sea, requires sufficient ship spacing, slow container transit speed, and sufficiently calm sea states along with expert operator control. A cable is attached to each ship and a cargo container or a net containing cargo is attached to the cable. The motorized movement of the cable transfers the cargo from one ship to the other. A controller is also employed to regulate tension on the cable to accommodate ship movement due to propulsion, wind, current, waves, and other disturbances. The controller functions to insure that cable tension does not get too tight to snap the cable or damage the ship and to insure that the cable does not become too loose causing the load to sag and/or become lost or damaged from water or wave action.

An expert crane operator with years of experience is able to effectively control sway by manually compensating for sway while moving the container or empty spreader quickly in a planned direction and speed. Expert crane operators are limited in number and often represent a scarce and costly resource, thus, it is desirable to have less skilled operators perform with the same proficiency as skilled crane operators. This can be accomplished by improving the crane control system capabilities through the addition of anti-sway control that enhances the operator's control. The anti-sway control can augment the manual control of the operator and provide cues to the operator and/or modify the operator's commands of speed, acceleration, and deceleration to reduce or eliminate sway. Conventional anti-sway control techniques operate by using a reverse deceleration scheme. For example, the operator accelerates the crane to move the container away from the ship. The anti-sway control measures this acceleration and provides the same amount of acceleration but in a reverse direction to decelerate the swing. Some controls use proportional integral control while others use speed or position, etc. to facilitate this control. The two-dimensional position can be controlled. However, conventional systems are not able to control a force coming from a third direction, such as wind coming from another angle and thus cannot control the movement that is out of plane. Therefore, there is a need to provide high speed, optimum time, and safe transit of cargo from ship to/from shore for container cranes and for cargo transfer in underway replenishment while compensating for out of plane forces acting on the crane and with non-expert operators.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to one aspect of the invention is a system that facilitates control of a crane. The system includes a model component that receives crane operating conditions and models a crane behavior based at least in part on the crane operating conditions. The system further includes a prediction component that receives the modeled crane behavior and infers a recommended crane action based at least in part on the modeled crane behavior.

According to another aspect of the invention is a method of controlling crane sway that includes modeling an operating state based upon at least one operating condition of a crane. The method further includes predicting crane sway based upon at least the modeled operating state and controlling sway of the crane. Determining a location of a container and guiding the container to a location is provided.

According to still another aspect is a system that includes complete models of the crane mechanics, crane control, wind and sea state, where the wind and sea state are 3D models. Predictive models are used to permit crane control changes before the crane is impacted by sea, ship, and wind conditions. Additionally, novels sensors are employed to detect spreader location, container load and container movement. The invention also provides novel steerable spreader vanes for spreader control before lifting and for spreader/container control after lifting.

Yet another aspect is a system for controlling a crane. The system includes a controller component that receives prediction information and a steerable vane control that interfaces with the controller component and controls an actuation and position of at least one steerable vane. Thus, at least one steerable vane can be located at a plurality of locations on a spreader and can be utilized in conjunction with wind to steer a spreader. At least one steerable vane is operated independently from at least another steerable vane, facilitating proper movement of the spreader, and/or mitigates container sway during transit and final positioning. The system can further include a model component that predicts crane behavior and a component that receives the predicted crane behavior and infers a crane movement.

According to another aspect is a method for controlling a crane. The method includes receiving crane operating data, modeling a plurality of parameters of a crane condition, diagnosing the plurality of parameters for a potential component failure or weakened condition, and outputting crane set points to a crane system. Outputting crane set points can include utilizing compensation control to alter a typical control action to protect a weakened component. Another aspect includes feeding back the output crane set points to at least one model component and diagnosing the feedback crane set points as at least one of the plurality of parameters.

The following description and the annexed drawings set forth in detail certain illustrative aspects of the invention. These aspects are indicative, however, of but a few of the various ways in which the principles of the invention may be employed and the invention is intended to include all such aspects and their equivalents. Other advantages and novel features of the invention will become apparent from the following detailed description of the invention when considered in conjunction with the drawings.

DESCRIPTION OF THE INVENTION

Figure 1:
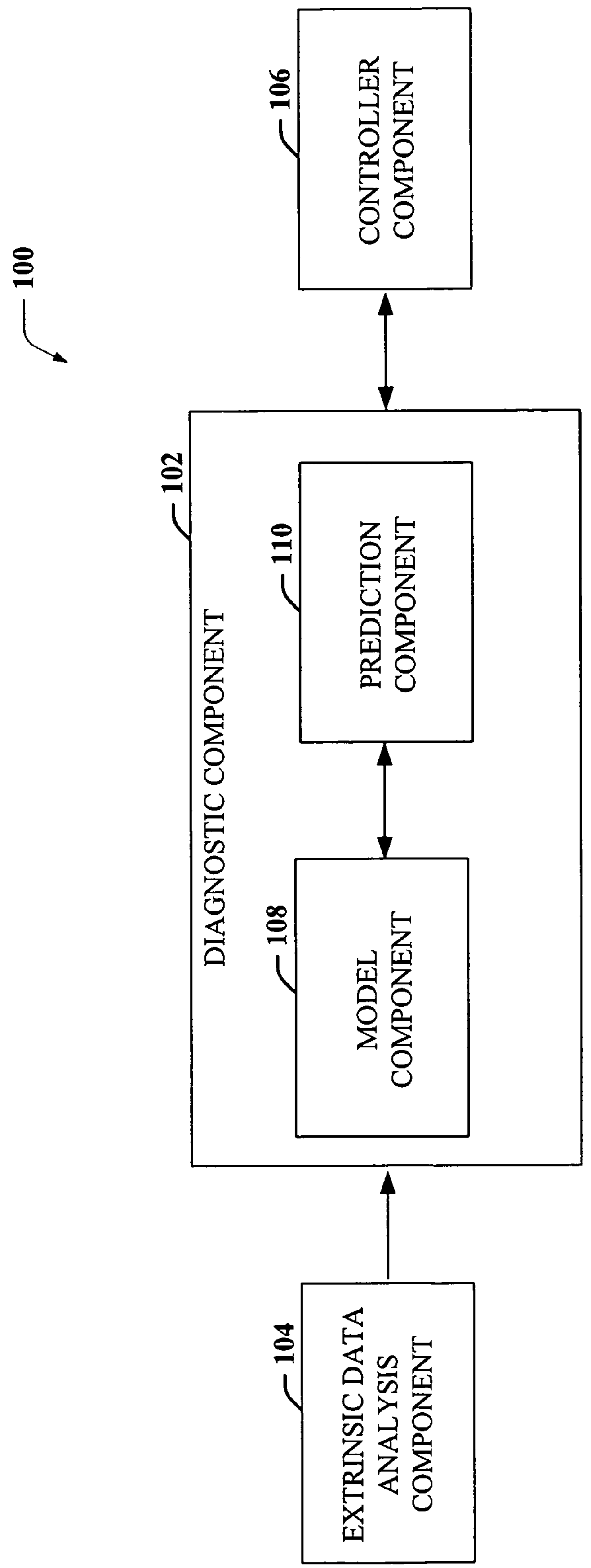
FIG. 1 illustrates a crane control system according to an aspect of the invention.

The invention is now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate describing the invention.

As used in this application, the terms "component," "agent," "module," "system," "controller," "device," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject application includes several aspects of enhanced control, diagnostics, and sensors. Provided is a model-based control that incorporates 3D wind and sea prediction models with non-linear optimizing control. Other techniques within the scope herein are the integration of diagnostic with control to provide dynamic optimum control without damaging equipment, the use of control and response information to provide enhanced system (e.g. crane) health, novel sensors and a controllable spreader. Alternatively or in addition, control may be realized with distributed autonomous agents.

FIG. 1 illustrates a crane control system 100 in accordance with an aspect of the invention. Generally, the crane control system 100 includes a diagnostic component 102 that can determine an anticipated crane sway motion based upon, for example, the operating state of the crane and provide and/or recommend counteractions to mitigate and/or eliminate the crane sway. More particularly, according to an aspect, the diagnostic component 102 can obtain data from an extrinsic data analysis component 104. The extrinsic data analysis component can include sensors, processors, communications, signal processing software and/or analysis software as described in more detail below. The diagnostic component 102 can apply modeling techniques and predictive measures based upon the data received from the extrinsic data analysis component 104 and convey such analysis to a crane controller component 106 whereby remedial actions to mitigate and/or eliminate crane sway can be performed either autonomously by the system 100 or through operator action. Changes to operator actions can be performed by altering such actions, such as filtering or scaling the operator command(s) and/or by providing dynamic cues, recommendations, and/or feedback to the operator during such operator's control activities.

The diagnostic component 102 can communicate with both the extrinsic data analysis component 104 and the controller component 106 in any manner that is known, or becomes known, without departing from the spirit and/or scope of the invention and claims appended hereto. For example, the communication protocol between the diagnostic component 102 and the other components (104 and 106) can employ any wired or wireless techniques. For example, in a wired aspect, an Ethernet, ControlNet, DeviceNet, Intellibus, AS-I, or FieldBus architecture can be employed. Moreover, in wireless aspects, an IEEE 802.11b, IEEE 802.15.4, Bluetooth™, Infrared, Internet, or the like can be employed.

The diagnostic component 102 receives data information relating to operating conditions of a crane system from an extrinsic data analysis component 104. The operating conditions of the crane system include aspects external and internal to the crane system. For example, the operating conditions can include wind speed, wind variability (e.g. wind gusts), and direction, sea-state conditions including ocean or sea current, wind speed, direction, and variability (e.g., gusts), and wave actions, container weight and location (current and destination locations), crane mechanical operation and machinery health, operator actions, operator efficiency, etc.

The extrinsic data analysis component 104 can employ various means to obtain data relating to the operating condition of a crane. For example, the detection component can receive data from wireless, ultrasonic, acoustic, optical, or contact sensors located on the spreader, containers, and/or a plurality of locations on the ship(s) and/or loading/unloading dock or truck located on shore and/or may receive data from radar systems, for example. The extrinsic data analysis component 104 may alternatively or in addition receive a user input whereby the user interacts with both the extrinsic data analysis component 104 and the diagnostic component 102 to enter data relating to an operating condition of the crane. The extrinsic data analysis component 104 can alternatively or in addition obtain input information from an external electronic device (such as a computer or portable communication device) either automatically, based on programmed data, or manually through a user input.

The controller component 106 can utilize established non-linear multi-input/multi-output (MIMO) control methods, for example, state-space, adaptive, model-based, constrained optimization methods, sliding-mode control, etc. The system and/or method utilized can optimize transit time over the entire path or trajectory by integrating hoisting/travel control subject to path constraints, such as other containers or objects.

The diagnostic component 102 further includes a model component 108 configured to interact with a predication component 110. The model component 108 models an anticipated behavior of a crane sway motion based upon the plurality of data components received from the extrinsic data analysis component 104 and data, which may be stored in a memory location. The model component 108, through both 2D and 3D model analysis, predicts or anticipates crane behavior, including cable sway analysis, and relates this information to the prediction component 110. The prediction component 110 analyzes the anticipated behavior and recommends and/or implements action(s) to counteract the anticipated behavior. For example, the prediction component 110 may allow sway action during transport of the container and only mitigate sway action when a container is being set in place. The prediction component 110 can utilize sway or induce additional sway while the container is in transit to improve (shorten) transit time and reduce acceleration requirements (and operator stress) during the final positioning action.

The diagnostic component 102 is configured to communicate with the controller component 106 to implement the recommended counteraction(s) to optimize container pick-up time, transit time, and container set-down time while eliminating sway to meet sway requirements and satisfy power and mechanical limitations as well as path constraints. The controller component 106 further interacts with control components of a crane system and/or with operators and/or maintenance personnel. The diagnostic component 102 may autonomously input control signals to the controller component 106 without an operator interaction based upon an inferred state. According to another aspect, the diagnostic component 102 may prompt an operator with recommended actions, which the operator can implement or override.

Figure 2:
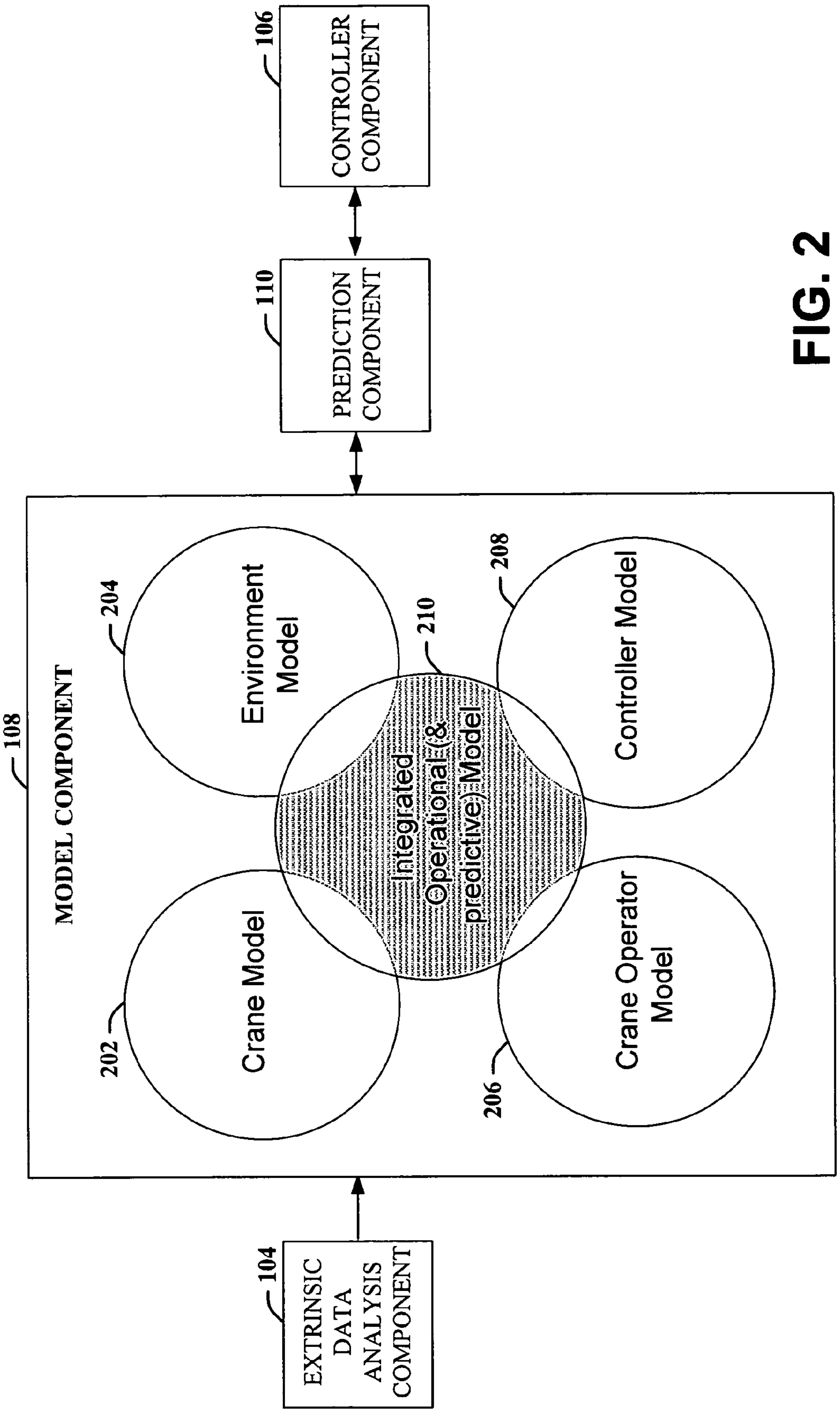
FIG. 2 illustrates an exemplary model component according to an aspect of the invention.

Referring now to FIG. 2, as illustrated, the model component 108 can employ a combination of operator, machinery, and control models to effectively control crane operation under dynamic conditions. While object-oriented-programming can be utilized in accordance with an aspect of the invention, it is to be understood that any suitable technique for modeling a crane system can be employed. Further, the model can include software applications that are employed in connection with a crane system. For instance, particular manufacturers may have specific applications that are employed in connection with a crane system process. These applications can be represented within the crane system model to further mitigate or eliminate sway.

The model component 108 optimizes control based on a combination of one or more optimization criteria including minimizing transit time, lowest energy costs, reliable operation, longest lifetime, lowest life cycle cost, smoothest transit, etc. Minimizing transit time takes into account constraints on the movement of goods due to crane braking power, allowable acceleration limits, as well as constraints on the container travel path due to the location of other containers, height of container stacks, as well as other physical obstructions. Reliable operation may take into account a new or inexperienced operator, windy conditions, and/or rough sea state. Smooth transit is optimized and provides for minimum acceleration or jerk and is especially necessary for transport of fragile cargo, including living cargo, such as humans or animals.

Exemplary modules employed by the model component 108 include crane model 202, environment model 204, crane operator model 206 and/or controller model 208 operatively interfaced with an integrated operational (& predictive) model 210. Each model element is dynamic and can change as operating conditions change. It is to be understood and appreciated that not all models are required for operation of the crane in accordance with an aspect of the invention. For example, just the crane model and controller module may be employed or just the controller module might be used for feedback control The crane model 202 can employ model-based control methods that include non-linearities associated with a motor, variable frequency drive, mechanical gearing, cable elasticity, container weight, and crane mechanics. The environment model 204 includes effects of ship motion due to tides, wave action, wind motion, mooring lines, and changes in cargo weight. The crane operator model 206 includes a model of the operator and operator actions to control the crane and further models the operator performance including skill level, skill needs, efficiency, and the expected operator action in response to system states. The controller model 208 can dynamically change control parameters such as controller gains and/or control structure based on sensed, predicted, and/or inferred operating conditions, such as experienced operator, operator in training, wind conditions, sea conditions, etc. The integrated operational & predictive model 210 receives input from the other models, compiles the data, and integrates the data into a comprehensive model based upon a subset of the other modules.

Figure 3:
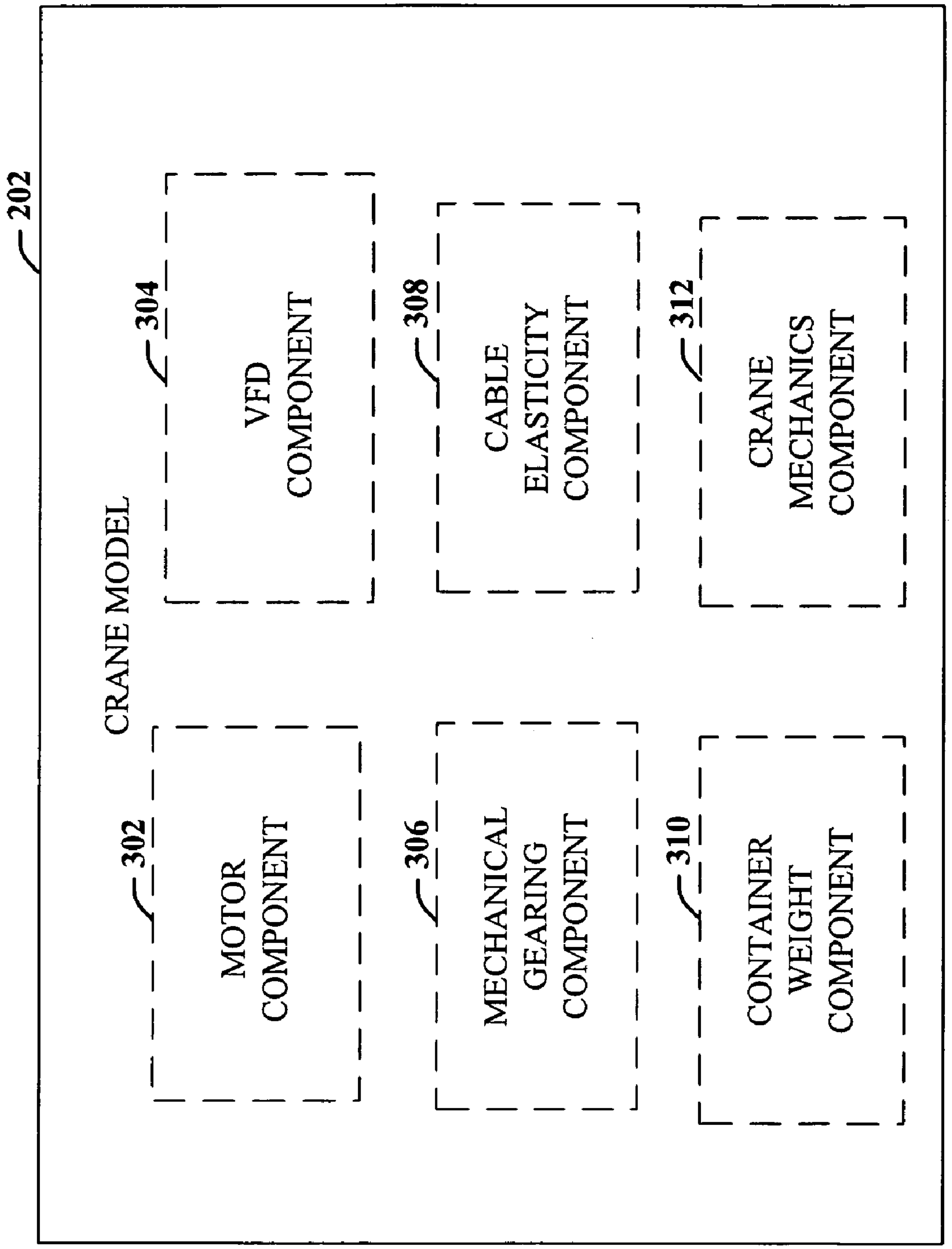
FIG. 3 illustrates exemplary components of a crane model that include non-linearities associated with aspects of crane control.

Referring now to FIG. 3, illustrated are exemplary components of a crane model 202 that include non-linearities associated with aspects of crane control according to the subject invention. The components of the crane model can be applied separately or in any combination to model the crane. A motor component 302 is capable of storing and/or accessing information associated with a crane motor(s), such as size, horsepower, rotor inertia, winding resistance, braking horsepower, voltage and current requirements, and other specific operating parameters. The motor component 302 is capable of receiving information regarding the current operating conditions of the motor(s) and is capable of determining the health of the motor(s). The determination of the crane motor(s) health can be based upon the motor(s) response to operator control commands. For example, if an acceleration command is sent by the controller and the motor(s) hesitates for a longer period of time then is usual before responding, responds with a reduced rate of acceleration (e.g. increased rise time), or does not approach the set point speed fast (e.g. increased settling time), it may indicate maintenance of the motor(s) is required, mechanical problems are occurring and/or machinery is degrading. A smart machine, such as an intelligent motor, may be able to determine an impending fault or accelerated machinery degradation and transmit this information to the crane controller. This permits integrating machinery health information with control to permit dynamic compensating control action to maintain optimum crane operation while preventing and/or mitigating machinery failure and/or avoiding dangerous operating conditions such as weakened cables or mechanical structures. Alternatively and/or in addition, this information can be relayed to an operator. Thus, operators and/or maintenance personnel can be alerted about potential unusual wear or hazardous conditions.

A variable frequency drive (VFD) component 304 is capable of receiving information associated with varying the speed of a motor. The VFD component 304 has stored information regarding the functionalities of the VFD, performance of the VFD (e.g. controller gains and current limits), and, similar to the motor component 302, is able to retrieve the stored information to model the crane behavior. The VFD component 304 can also access the health of a VFD based upon performance and alert an operator/maintenance personnel of the VFD health. Alternatively and/or in addition to notifying an operator, the VFD component 304 can automatically and/or autonomously initiate a change in the control action in order to respond to the health of the VFD. For example, the VFD component 304 may sense some of the power structures associated with the crane are overheating and may cause a change in the carrier frequency for the controller pwm (pulse-width modulation) signal sent to the motor. This could result in a noisier operation or less energy-efficient operation. The VFD component 304 would allow continued movement of cargo without failing a critical component and maintain the critical loading/unloading operation until the task is complete and/or when maintenance can be performed.

A mechanical gearing component 306 is capable of storing and/or accessing information associated with specific mechanical gearing of a crane, such as a gearbox or brakes. This information can be provided by the manufacturer and/or through historical crane data obtained from actual crane operation. The mechanical gearing component 306 models expected crane performance and can provide information regarding the health of the crane in association with the motor component 302 and/or the VFD component 304. Aspects of the mechanical gearing component 306 include a high limit override that senses if the crane picks up a load that is too heavy for the crane and can model crane behavior based on this overload condition and/or alert an operator. The sensing can be performed by a sensor that measures torque on the gearing or a measurement of amperage draw on the motor, or the like. The mechanical gearing component 306 can also include a low hook limit and a high hook limit to ensure the cable is limited in its payout and does not continue to unwind while picking up a container and/or does not impact the crane structure or other devices when lifting a container or being retracted. The mechanical gearing component 306 can include embedded processors and sensors or logic in the controller to monitor performance related to the health or condition of the gearbox. Abnormal problems such as gear teeth wear, gear backlash, broken gear teeth, bearing faults, lubrication contamination or loss of lubrication may be detected. Techniques such as motor current signature analysis and vibration analysis are capable of detecting these faults. A corresponding change in the control can be initiated by an operator and/or automatically initiated to minimize stress or wear to weakened or failing components. Alternatively or in addition to notifying an operator, component health information can be sent to the crane control module. Integrating machinery health information to provide automatic compensating control can maintain crane operation, prevent damage to machinery, and/or prevent an unsafe operating condition or catastrophic failure (e.g. cable snapping, gear breaking, shaft snapping, . . . ).

Another component associated with the crane model 202 is a cable elasticity component 308. The elasticity or "stretch" of the cable is a function of whether there is a load on the cable and the weight of the load. If there is no load, the elasticity of the cable is at a minimum. If there is a load, the elasticity of the cable becomes critical especially where the weight of the load approaches the maximum limits of the crane. It is possible to detect load disturbances such as an unexpected cable stress profile when lifting or depositing a container. It is also possible to detect cable resonance due to load movement or wind. Information about the cable can be relayed back to the operator, permitting the operator to change how the crane is operated to prevent a failure. Alternatively and/or in addition to notifying an operator, cable health information can be sent to the crane control module. Integrating machinery health information to provide automatic compensating control can maintain crane operation and prevent damage to machinery or prevent an unsafe operating condition or catastrophic failure (e.g. cable snapping, spreader breakage, or dropping a container).

A container weight component 310 receives information regarding the weight of a container being moved by the crane. This information may be input directly by the operator and/or the container weight component 310 may automatically sense and/or calculate the container weight when the container is lifted by sampling and analyzing data from load cells, motor current, acceleration times, amount of cable stretch, or pulley mounting stress. The information from the container weight component 310 can be integrated with the information compiled by the other components of the crane model 202 to access or model the requirements necessary to mitigate and/or eliminate container sway when a container is to be set in position.

The container weight component 310 information can be integrated to provide an overall optimized control strategy and control action can be automatically implemented to optimize container transportation while minimizing energy costs, reducing operator stress, monitoring the condition of critical crane components, and preventing a crane component failure. For example, controller gains can be reduced or increased dynamically and the control action changed to direct more power to horizontal movement initially and then to the lifting/lowering action to result in an overall optimum speed and energy trajectory.

Further, the crane component 202 may include a crane mechanics component 312 that includes a subset of crane mechanics based upon historical crane mechanical data obtained as well as the current performance of the crane. The information modeled by the crane mechanics component 312 includes the crane mechanical structure. For example, this model includes the interactions, deflection, mechanical resonance, strength, and functionality of the boom, spreader bar, gearbox, pad-eyes, pulleys, motor, cables, gondola, crane base, wheels, etc.

Figure 4:
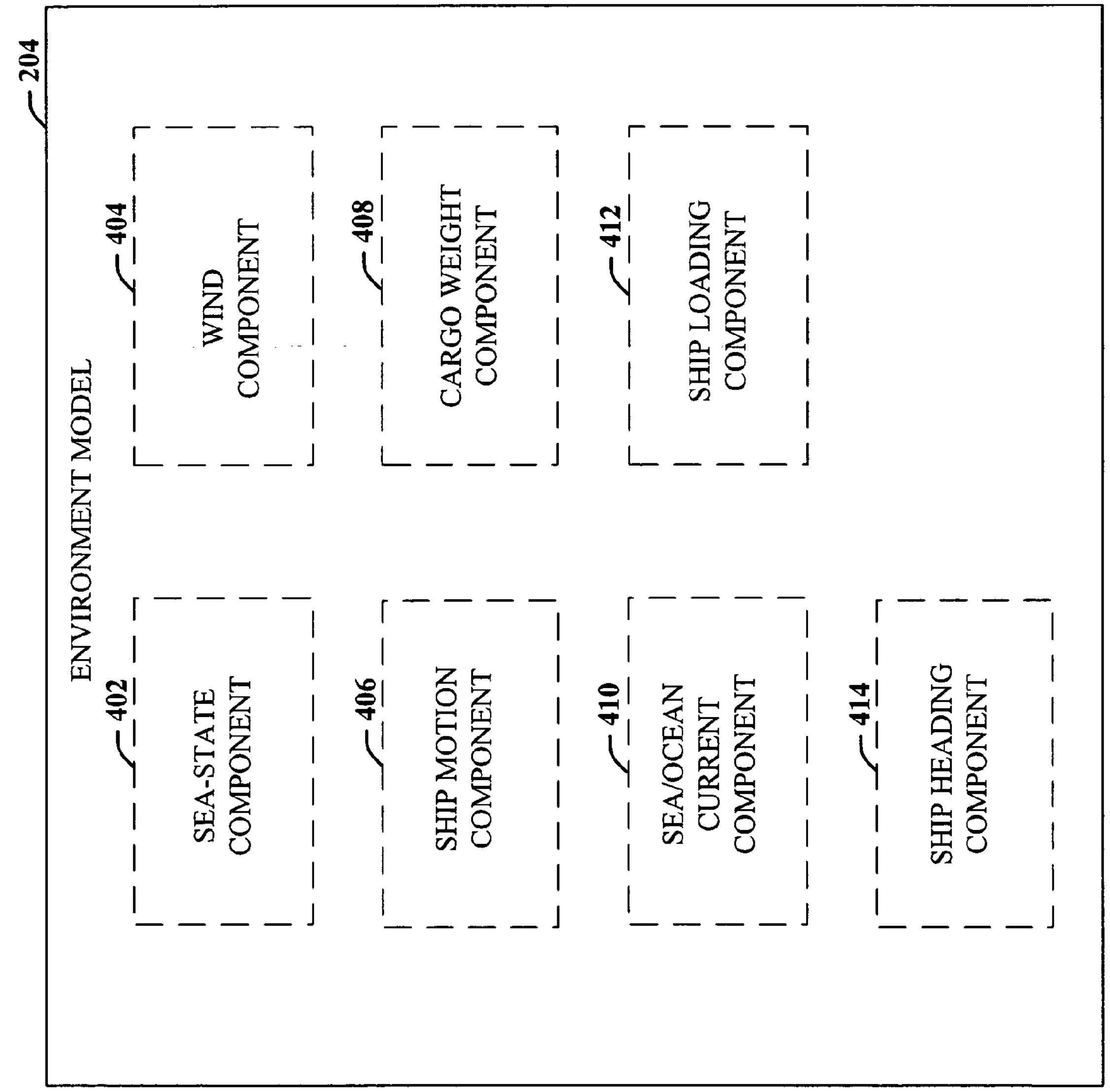
FIG. 4 illustrates exemplary components of an environment module in accordance with an aspect of the invention.

Referring now to FIG. 4, illustrated are exemplary components associated with an environment model 204. The environment model 204 is provided because even if the plant (or crane) model is accurate, there will be ship and container movement due to forces unassociated with the crane. The ship movement and container movement may be due to sea conditions (sea state, current speed, direction, and the like), wind, steering and heading if underway, and/or cargo loading weight. The components of the environment model 204 can be analyzed in any combination of one or more component.

A sea-state component 402 receives information associated with the state of the sea. For example, if the ship is in harbor and containers are being transferred to/from the dock, the relative motion of the sea against the ship in relationship to the dock/open sea is monitored. If the ship is at sea and there is a ship-to-ship cargo transport or an underway replenishment process, the crane is part of the ship and there will be more motion of the ship due to the ship(s) being on the open sea, which will be different than if the ship is at dock. For example, in an underway replenishment situation, the wave may be hitting the ships differently. The ships may be side by side and one is receiving the brunt of the wave because of the location of the ships in relationship to each other and to the waves. In this situation, the wave will act to try to push one ship into the other and the environment model will consider this when modeling the crane action. In addition, one boat may be moving up on the crest of a wave while the other ship is moving down in the trough of the wave. Thus, if not correctly interpreted, this motion may cause the container to be slammed into one ship or not picked up in the other ship due to the relative movements of the ships. It is possible for one ship to alter the sea state experienced by the other ship because of such factors as blocking and/or attenuating waves or due to the ship's wake. The sea state component 402 is further able to determine or estimate these 3D disturbances (e.g. ship motion on the sea) and cargo transfer will be more safely conducted even with ships located closer together and/or with more severe wind and ship conditions.

It should be noted that there is some predictability of the sea-state relating to both the direction and the amount of movement that the ship might incur, although there is some variability within this predictability. For example, if there is ship movement due to sea-motion, the model can consider that movement and determine that, for example, after the last ship movement the ship will most likely not experience another motion for three seconds, for example. This time can be utilized to perform tasks such as to stabilize a load, move a container, and/or control the system. The technique of estimating the time of a future occurrence and/or length of duration of ship quiescent state has been utilized to direct the landing of helicopters on ships during rough seas, for example. Thus, when there is a high degree of ship motion, the controller will be less susceptible to failure with the proposed technique(s) due to the potential for faulty control during this time being reduced, resulting is a lesser likelihood of banging the container into another container, ship, personnel, etc. and improved safety and reduced cargo transit time. Thus, there is an optimal time window for placing containers due to sea-state or other motion, which can be predicted by the model.

A wind component 404 is capable of obtaining wind direction and/or speed information to be captured by the environment model 204. This information includes steady state wind speed and direction, wind gust characterization (direction, force, duration, and probability distribution, for example), turbulence conditions and turbulence likelihood. The environment model 204 is able to model the effect of the wind based upon the existing measured wind state and predict or model the wind effect. This information can provide a basis for initiating a change in the control before realizing the effects of an actual change in the wind speed or direction. This will result in superior control, safer crane operation, and less chance of damage to the crane, cargo, and ship. A 3D model of wind and predicted wind effects can be utilized to compensate for wind using in-plane compensation. That is to say, generally, the in-plane compensation does not take into effect a disturbance coming at the cable at a different angle. The 3D model is able to predict this disturbance and, using the available in-plane movement of the crane, mitigate or eliminate the out-of-plane disturbance and total container error.

Another component of the environment module 204 is a ship motion component 406 that works in conjunction with the other components of the environment model 204. The ship motion component 406 receives information about the movement of the ship including the side-to-side pitch motion of the ship. For example, personnel on the ship may need to move containers already on the ship for a number of reasons, such as to realign the containers or because the containers were loaded onto the ship in random order and while transporting the containers, the ship crew needs to reorganize the containers for proper unloading. During the underway replenishment process, the current ship deck position and expected deck position trajectory can be estimated. The ship motion component 406 is able to obtain data regarding ship speed and in conjunction with other components, such as the sea-state component 402 and wind component 404, and up to six (6) degrees of freedom (6DOF) ship motion (x, y, z, roll, heave, and pitch) and model the effect of each component's data to obtain optimal performance of the crane. It is to be understood that anywhere from zero to six degrees of freedom can be monitored.

There may also be a cargo weight component 408 associated with the environment module 204. The total cargo weight affects the motion of the ship during transport. Additionally, as containers are removed and/or added to the ship, the total cargo weight changes and, thus, the placement of the ship in the water is affected. For example, as containers are removed from a ship, the ship becomes lighter and may rise slightly higher out of the water. This will affect the placement of the spreader over the next container to be removed as well as the placement of the container in the removal location. For example, if the container is to be placed on the dock, the placement position or height will need to be adjusted to take into account the placement height of the last container and the movement of the ship out of the water. During underway replenishment, as containers are removed from a first ship and placed on a second ship, the first ship becomes lighter and rises while the second ship becomes heavier and lowers. It is also noted that the waves, tides and sea current will affect the ship differently depending on the depth of the ship in the water, which can be modeling according to various aspects of the disclosed systems and methods herein. Container weight will also affect cable stretch, the affects of some disturbances (e.g. wind), and acceleration/deceleration time and raising and lowering times.

Also provided is a sea/ocean current component 410 that receives and/or obtains data relating to the sea or ocean current. Parameters associated with the current include height, frequency, strength, etc. The current can cause the ship to drift and can impact the direction and speed of the ship, which should be taken into consideration when controlling crane movement and reducing crane sway.

A ship loading component 412 can be provided that can receive and/or obtain information regarding the loading of containers on the ship. For example, the ship loading component 412 can contain information regarding the placement of the containers as well as other data associated with the containers (e.g., weight, location (current and destination), contents, . . . ). When the ship is being loaded with containers the ship loading component 412 receives such information and can distinguish between containers being added to the ship and ship movement due to water coming on board due to weather conditions (e.g., rain), waves, etc.

Another component that can be associated with the environment module 204 is a ship heading component 414 adapted to interact with, for example, the ship controls to determine the direction of the ship in relation to the sea and/or earth (e.g., longitude, latitude). The ship heading component 414 can visualize the position of the ship in the sea and infer or predict how wind, current, etc. will affect the ship, crane, and/or container.

Figure 5:
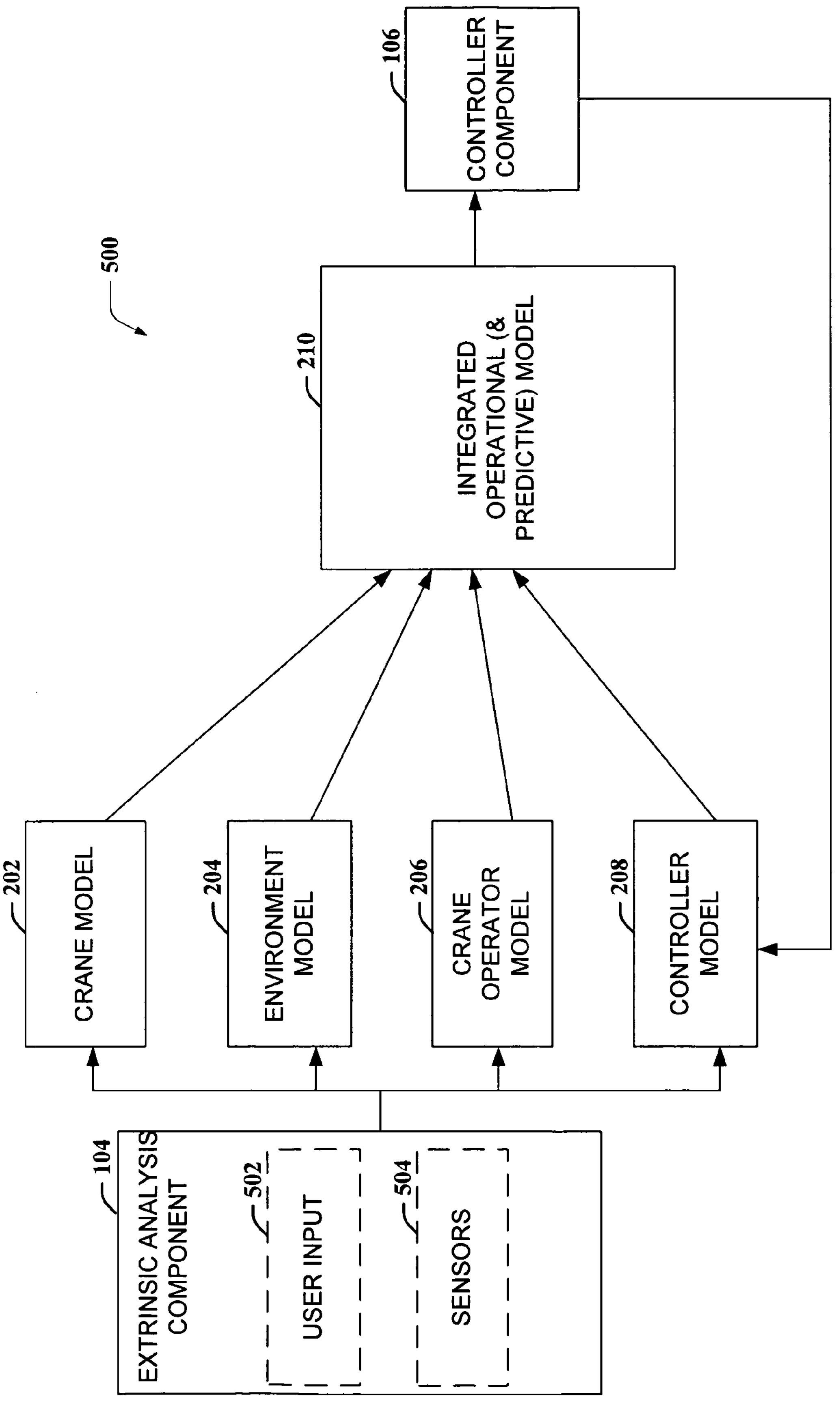
FIG. 5 illustrates an exemplary crane control system in accordance with an aspect of the invention.

Referring now to FIG. 5 illustrated is a schematic representation of an anti-sway control and underway replenishment control system 500 in accordance with an aspect of the invention. Input is provided to 2D and/or 3D models 202-208 from an extrinsic analysis component 104 that can obtain data from a user input 502, for example.

The user input 502 can be in the form of the crane system 500 learning from an operator. For example, the operator may be experienced and the models 202-208 may learn from the operator during a "learning" mode. Thus, the actions taken by the operator are modeled and the system 500 learns and stores the actions in a memory location.

The user can interact with the models to select and provide information via various devices, such as a crane controller, a joystick, a computer, a portable electronic device, a mouse, a roller ball, a keypad, a keyboard, a pen and/or speech recognition and voice activation, for example. Typically, a mechanism such as a push button or the enter key of a keyboard can be employed subsequent to entering the information in order to initiate information conveyance. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In addition and/or alternatively, a heads-up display module can be utilized to enhance operator view and understanding of the crane operation. Such heads-up displays can be utilized for augmented reality applications. A heads-up display can consist of a micro-display module integrated with glasses and/or goggles to integrate control and state information with a visual image of the crane. The heads-up display system can present static data information such as from a database (e.g. container weight from the ship's manifest or crane load limits) and/or can display dynamic information from sensors or from the crane controller (e.g. the distance the spreader is to container or the actual measured container weight when lifted).

Alternatively or in addition, input is provided to the models 202-208 from one or more sensor(s) 504 located in a plurality of locations. Wireless sensors can be placed on the spreader and containers and provide information as to how much the load is swaying. Wireless sensors can also provide information on loading at each corner of the spreader, the spreader speed, and/or the distance between the spreader and the container. Some swaying is induced by accelerating the load while other sway is induced because the load may not be right over the designated location and the operator moves the load quickly to place it at the right location, thus inducing sway. Other sway is due to the affects of wind, ship motion, crane motion, etc. It is important to know how much the cable is swaying to provide a proper adjustment to mitigate and/or eliminate the sway during placement of the container. However, sway while the container is in transit may improve transit time and reduce acceleration requirements during final positioning of the container. Thus, further or additional sway may be induced rather than mitigated during transit to reduce movement time.

The angle of the cable indicates the amount of sway at each stage of movement. To determine the angle of the cable, sensors, such as contact sensors, optical sensors, non-contact sensors such as electromagnetic, inductive, and Hall effect sensors, and the like can be utilized. Contact sensors include, for example, cable rollers or cable guides. Non-contact sensors, such as inductive proximity probes, ultrasonic, or Hall effect sensors can sense the angle of the cable. Other sensors for determining cable angle include vision (e.g., camera), photoelectric, linear detector array, etc. Optical sensors and techniques are not reliable when exposed to the environment in conditions such as snow, fog, or rain and therefore, it may be desirable to incorporate other sensors in addition to or in place of optical sensors. Alternatively or in addition, force transducers may be utilized on the cable roller to estimate the angle of the crane cable. The sensors can be employed individually or in combination. Sensor fusion techniques can be employed to improve accuracy of position estimate and/or confirm accuracy of the sensor response.

Proximity probes can be utilized to determine cable angle and will not wear due to cable travel. An advantage of utilizing proximity probes is that they are immune to weather conditions. High frequency sampling may also permit inspecting the cable during raising and lower operations and for sensing cable vibration.

The system 500 can utilize multiple cable angle sensing methods, such as optical sensors, contact sensors, non-contact sensors, force transducers, proximity probes, etc. A multiple cable sensing method provides greater accuracy of the sensed cable angle and enhanced reliability.

According to another aspect, the crane can automatically locate a container to be moved. Thus, the location and the position of the container need to be determined. Ultrasonic sensors can be employed on the spreader to sense container position and orientation relative to the spreader. Additionally or alternatively, another set of ultrasonic sensors to establish spreader position relative to the base of the crane can be employed. Global Positioning System (GPS) coordinates can be utilized to locate containers to be moved and for placing in a final location. Other sensors to locate a container include acoustic sensors or radar systems.

Wireless or ultrasonic sensors may be placed on the spreader so that the spreader, through a control, knows how far it is from the container. With a radio link, or other data transmission, this information can be transmitted to the main controller. This can cause the main controller to move the cable or gondolas car or know what to do to correct any errors, such as how much to lower the container. Exemplary sensors for determining spreader or spreader/container location can include GPS, ultrasonic, optical (e.g., camera). Such sensors can be employed individually or in combination. Alternatively and/or in addition, sensor fusion can be utilized to improve accuracy of the spreader position and/or to ensure accuracy of the sensor response.

The input from the extrinsic analysis component 104 is communicated to the models 202-208 that perform both 2D and 3D modeling of respective aspects of the operational conditions of the crane, ship, and containers. The modeling information is communicated to an integrated operational and predictive model 210. The integrated model 210 combines or aggregates the data from the models 202-208 into an integrated model and predicts the movement and sway of a container, especially when the container is being placed into location. It can also establish the accuracy or precision of the estimate. The integrated model 210 can also predict recommended action to mitigate or eliminate the container sway to allow the container to be located and placed at a destination point as quickly as possible. The integrated model 210, based upon the received information and subject to path constraints, may, for example, recommend lifting a container off-vertical axis from the container axis. In such a manner, it will accelerate the container in the desired direction of travel to reduce transit time further. The integrated model 210 may receive the path information from a GPS system or an operator who defines what might be a free travel state without colliding with other containers. The containers may then be set in location by the system and the system automatically indexes to next container location (e.g. lower position, higher position, next stack of containers, etc.).

The integrated model 210 outputs the recommended action to a crane controller component 106. The recommended action can be performed automatically by the crane controller component 106 or it might be output as a prompt to an operator. For example, if an operator has indicated, through a prompt or other action, that the particular operator is less experienced and desires assistance, the controller component 106 can offer prompts of recommended actions (e.g. slow down initial acceleration). The operator can accept the prompts and approve the action. The action can then be carried out manually by the operator and/or automatically invoked via an operator command, such as a push button and/or voice activation. Alternatively and/or in addition, the operator can reject the recommended action and manually control the crane in a different manner. In this way, the operator gains experience, by learning from both the recommended prompts and, alternatively, by rejecting the prompts and learning from potential mistakes made when not following the recommended prompts. The actions taken are logged along with the crane operation and timestamp information. The action taken can also be fed back to the controller model 208 for subsequent modeling action by the integrated operational (& predictive) model 210. Data captured can also be available for later review and analysis to improve operator training. This information can also be utilized to drive an augmented reality and/or virtually reality training system to further enhance operator training utilizing real data but without the cost, time, and risk of using an actual crane with real ships and cargo.

Figure 6:
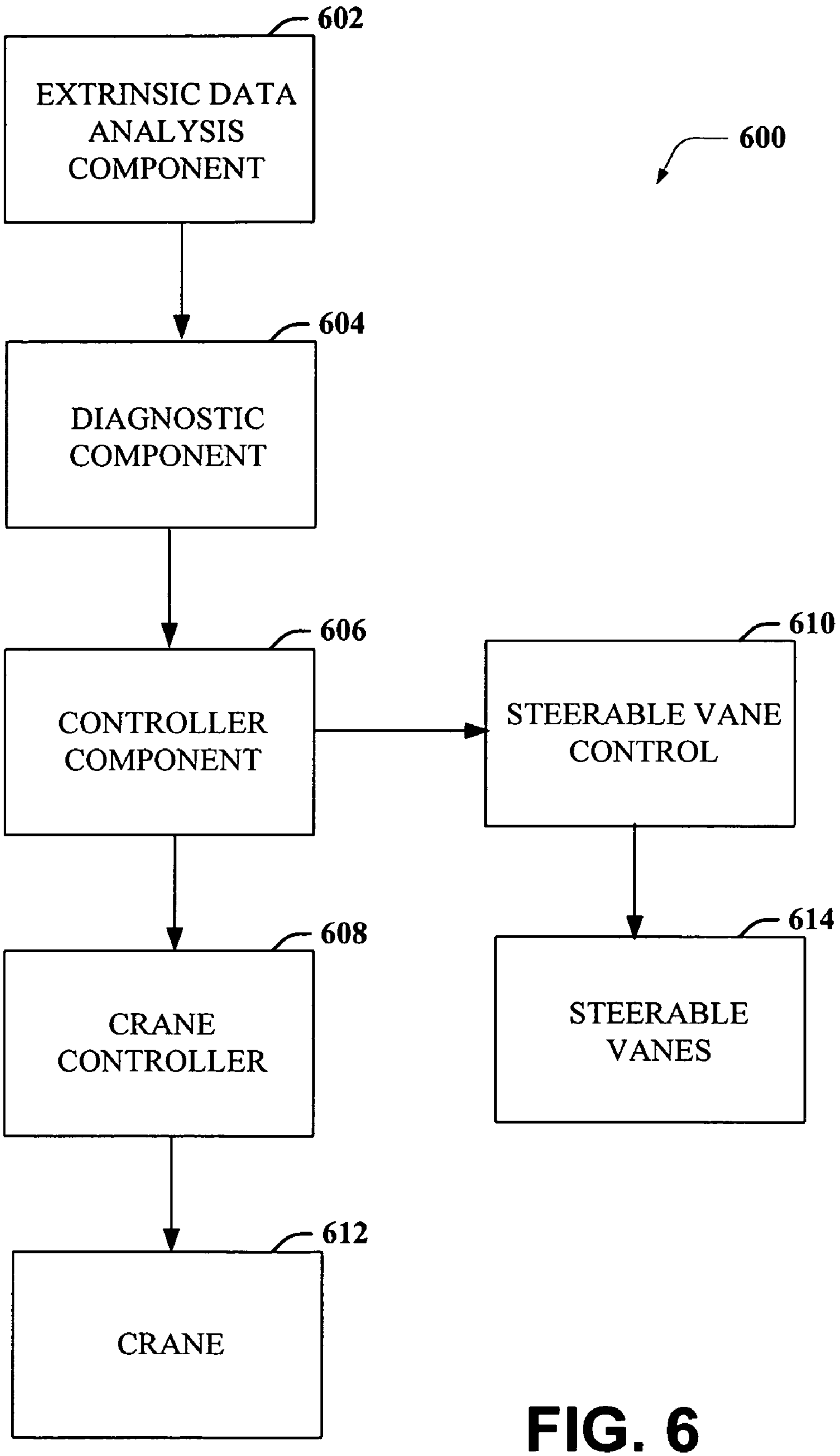
FIG. 6 illustrates a block diagram of a system to control steerable spreader vanes according to an aspect of the invention.

FIG. 6 illustrates a block diagram of an exemplary system 600 employing steerable vanes in accordance with an aspect of the invention. The system includes an extrinsic analysis component 602 associated with a diagnostic component 604. The extrinsic analysis component 602 obtains information regarding the operating conditions of a crane system and communicates this information to the diagnostic component 604. The diagnostic component 604 models crane action based at least in part on the information received from the extrinsic data analysis component 602. The diagnostic component 604 further predicts effects of the operating conditions on the crane system and the most effective actions to take to move a spreader or spreader/container to a final destination.

The diagnostic component 604 outputs information in the form of recommended actions to a controller component 606. The controller component can manage and/or control both a crane controller 608 and a steerable vane control 610. The crane controller 608 is operative to control the movements and actions of a crane 612.

The steerable vane control 610 is operative to control the actuation and position of steerable vanes 614. There may be one or more steerable vanes located on a multitude of locations on the spreader. Each steerable spreader vane on the spreader can be operated independently, or in combination, to achieve proper movement of the spreader and/or container. The steerable vanes assist in the control of out-of plan sway due to effects of ship movement, wind, and other external factors. The steerable vanes also help minimize sway during transit and the final positioning steps of placing a container. The steerable vanes are used in conjunction with the wind to help steer the spreader. Thus, the spreader can be further moved with the wind to position the cargo over the target landing position.

Figure 7:
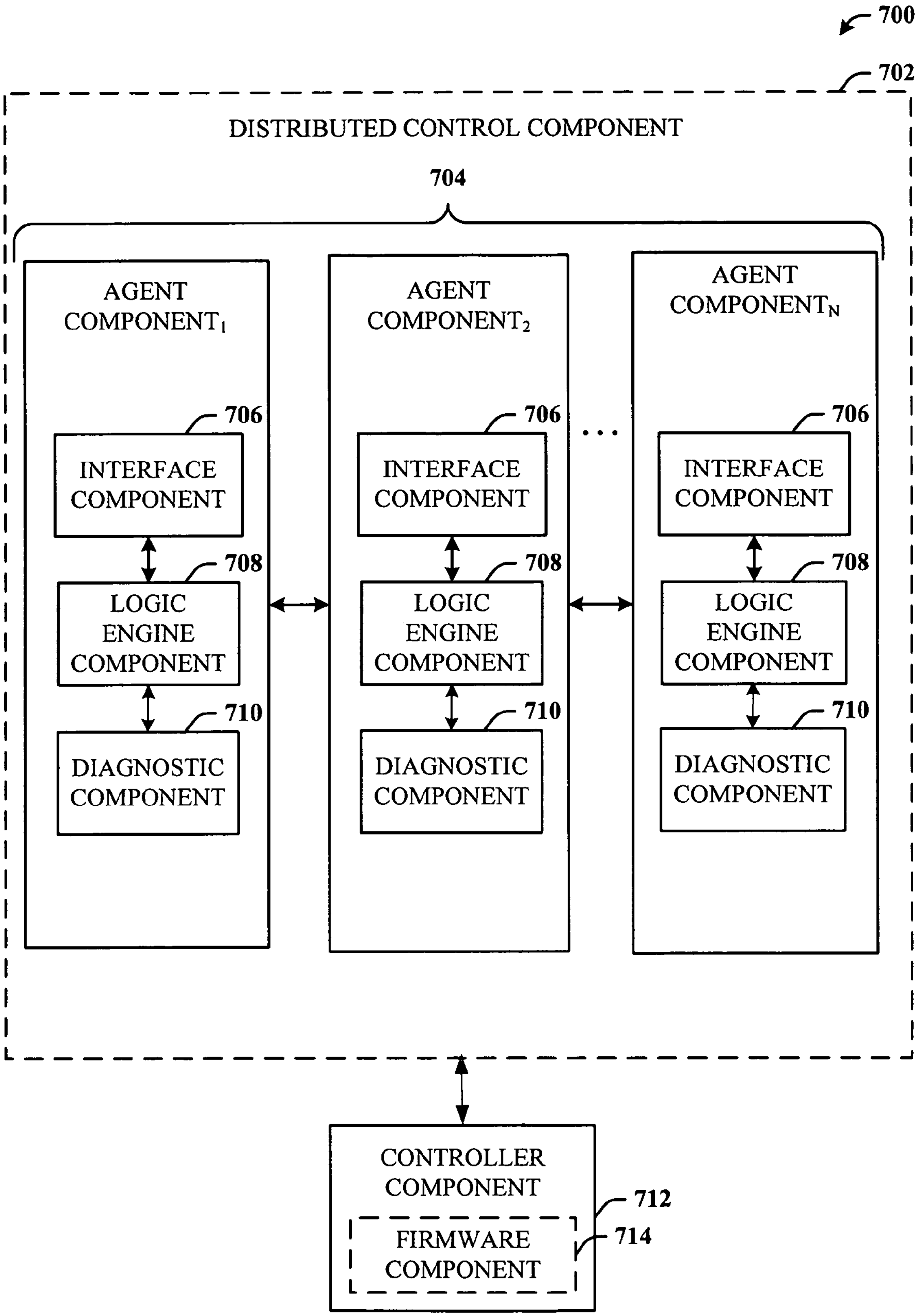
FIG. 7 illustrates a distributed control component in accordance with another aspect of the invention.

FIG. 7 illustrates a distributed control architecture 700 in conjunction with a model-based control. The distributed control architecture 700 utilizes distributed autonomous agents, for example, to realize machinery protection and adaptive control. For example, agents may be associated with lateral travel, hoisting, spreader action, spreader vane operation, and/or operator action. These elements can be further decomposed. For example, lateral travel can consist of a suite of agents including a horizontal travel motor, gearbox, VFD, brake, and power supply. Under distributed control, each element relates to each other. For example, one agent can be a controller for the spreader, another agent for raising and/or lowering, and another agent for horizontal movement.

The distributed control architecture 700 can employ an agent technology layer that operates in connection with or integral to a controller and can be an extension of the controller's firmware to facilitate logic reasoning and decision-making. As shown, distributed control component 702 can include 1 to N agent component(s), where N is an integer. Agent components 1 to N can be referred to individually or collectively as agent components 704. As illustrated, an interface component 706, logic engine component 708, and diagnostic component 710 can be deployed within the individual agent components 704. A diagnostic component 710 can provide intelligent reasoning. Specifically, a diagnostic component 710 can obtain information from the interface component 706 and logic engine component 708, apply intelligent reasoning and convey such diagnosis (e.g., analysis) to a controller component 712 (e.g., base controller firmware) whereby subsequent desired actions (e.g., spreader vane action, lateral travel) can be performed. Control actions prescribed are established with consideration of the current and/or predicted future crane state. Moreover, environmental effects (e.g., expected or possible), can be considered in connection with alternative aspects of the diagnostic component 710 and the system described herein. Thus, the agent components 704 can establish system diagnostics and perform desired logic and/or reasoning in a distributed manner by collaborating with each other.

With respect to the deployment of intelligent agent components 704, any desired collaboration protocol and agent discovery system can be deployed. For example, Contract Net, Auction, Market-based Model and Global Resource Locators (e.g., directory facilitators) or the like can be utilized. By way of further example, operating in accordance with such protocols, the agents 704 can modify their communication and negotiation behavior in ways that can result in a reduction in the number of signals that are sent among agents 704 and thereafter processed. This, in turn, can reduce the amount of communication that occurs among the agents 704 and can increase the speed of collaborative decision-making among the agents 704.

In one aspect, messages between disparate agents 704 can be scripts communicated in the job description language (JDL), and wrapped in additional formatting information in accordance with a specialized, universally accepted communication language, for example, the Foundation for Intelligent Physical Agents (FIPA) Agent Communication Language (ACL) or the Open Systems Architecture for Condition Based Maintenance (OSA-CBM). In alternate aspects, other distributed agent architectures and corresponding interaction protocols and communication languages can be employed without departing from the spirit and/or scope of the invention and claims appended hereto.

Moreover, the communication within the agent infrastructure 700 can be bound by a defined criteria (e.g., meta-level). These convergence criteria can be employed to assist in avoiding infinite cycling between agent components 704. In one aspect, the meta-level criteria can be user defined from a primary rules perspective. It will be appreciated that, through collaboration and/or learning, the agent components 704 can combine the knowledge and evolve the state of rules to create boundaries whereby the system operates within reasonable ranges. Additionally and/or alternatively, the system can adapt to changes in the crane mechanical performance, changes in the environment, changes in operator proficiency and preferences, and changes in load characteristics. The system can also dynamically optimize performance criteria subject to constraints such as speed, horsepower, and weight to minimize energy consumption, transfer containers in a minimum amount of time, and/or to reduce the total life cycle cost of the crane system. The objective criteria and constraints can change dynamically in response to different ship loading/unloading requirements, environment changes, and/or mission requirements.

The controller component 712 can include a firmware component 714. Firmware component 714 can be conventional such that it includes programming that can be found in controllers employed in non-agent-based distributed control systems, particularly conventional non-agent-based industrial controllers such as personal computers (PC's), single-board computers, personal digital assistance (PDA's), or smart machines such as smart VFD's, smart motors (e.g., motors with embedded processors, sensors, and/or diagnostic/prognostic algorithms), and/or other embedded computer systems. Firmware component 714 can facilitate processing interactions between the controller component 712 and devices (not shown) external to the controller component 712.

Figure 8:
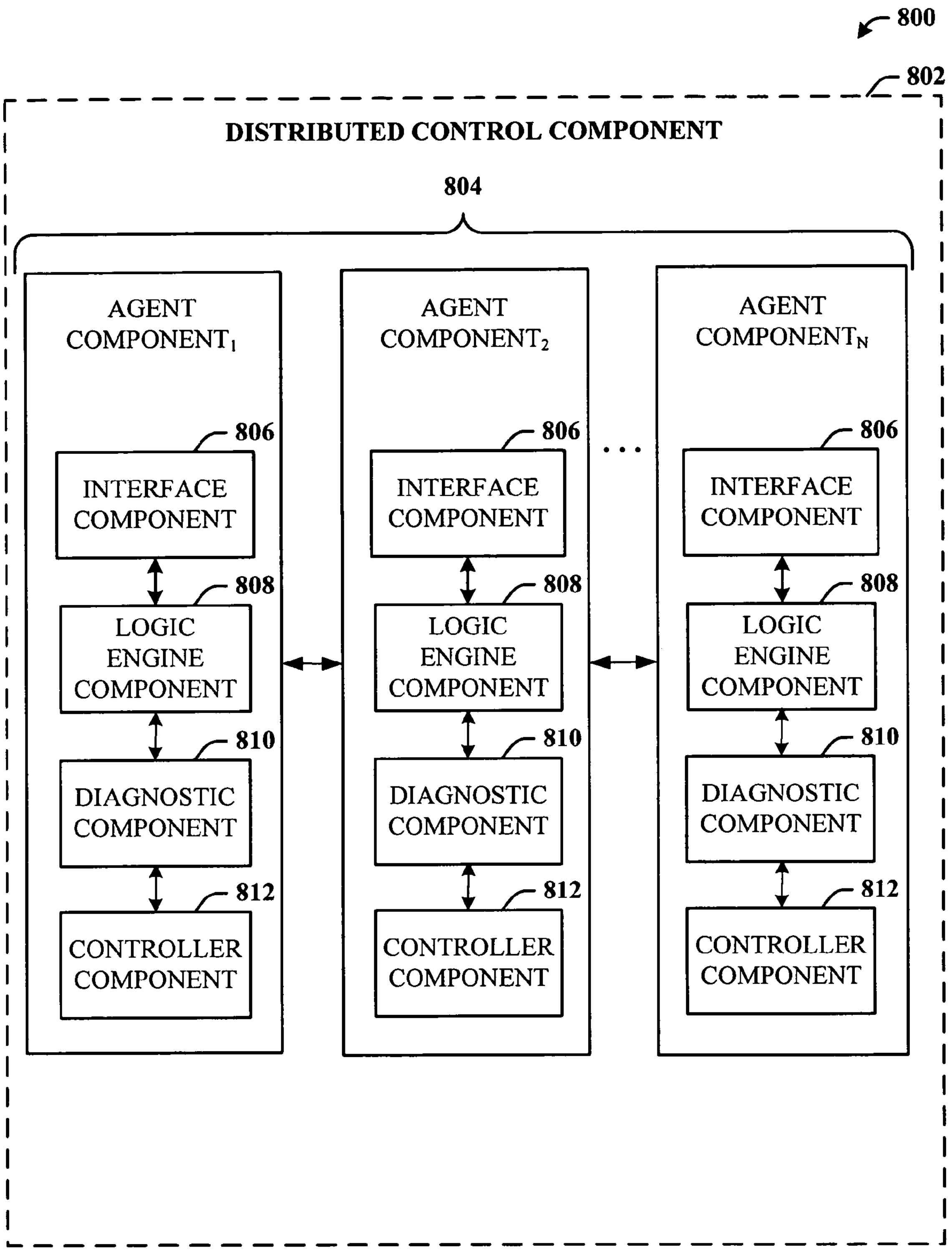
FIG. 8 illustrates an exemplary distributed control architecture utilized in conjunction with a model-based control.

With reference now to FIG. 8, illustrated is an exemplary distributed control architecture 800 utilized in conjunction with a model-based control. The architecture 800 is similar to that shown and described with reference to FIG. 7, however, each agent 804 has an embedded controller component 812. This provides local control within the scope of each agent component 804. Each controller 812 within its respective agent component 804 controls local components to achieve each agent's unique objective(s) for autonomy and/or collaboration. The illustrated architecture 800 is a fully distributed diagnostic, analysis, and control topology that can provide superior control and/or optimum performance without any single point of failure. It is to be understood that other architectures for distributed autonomous agents may be utilized and fall within the scope of the subject specification and the appended claims.

Figure 9:
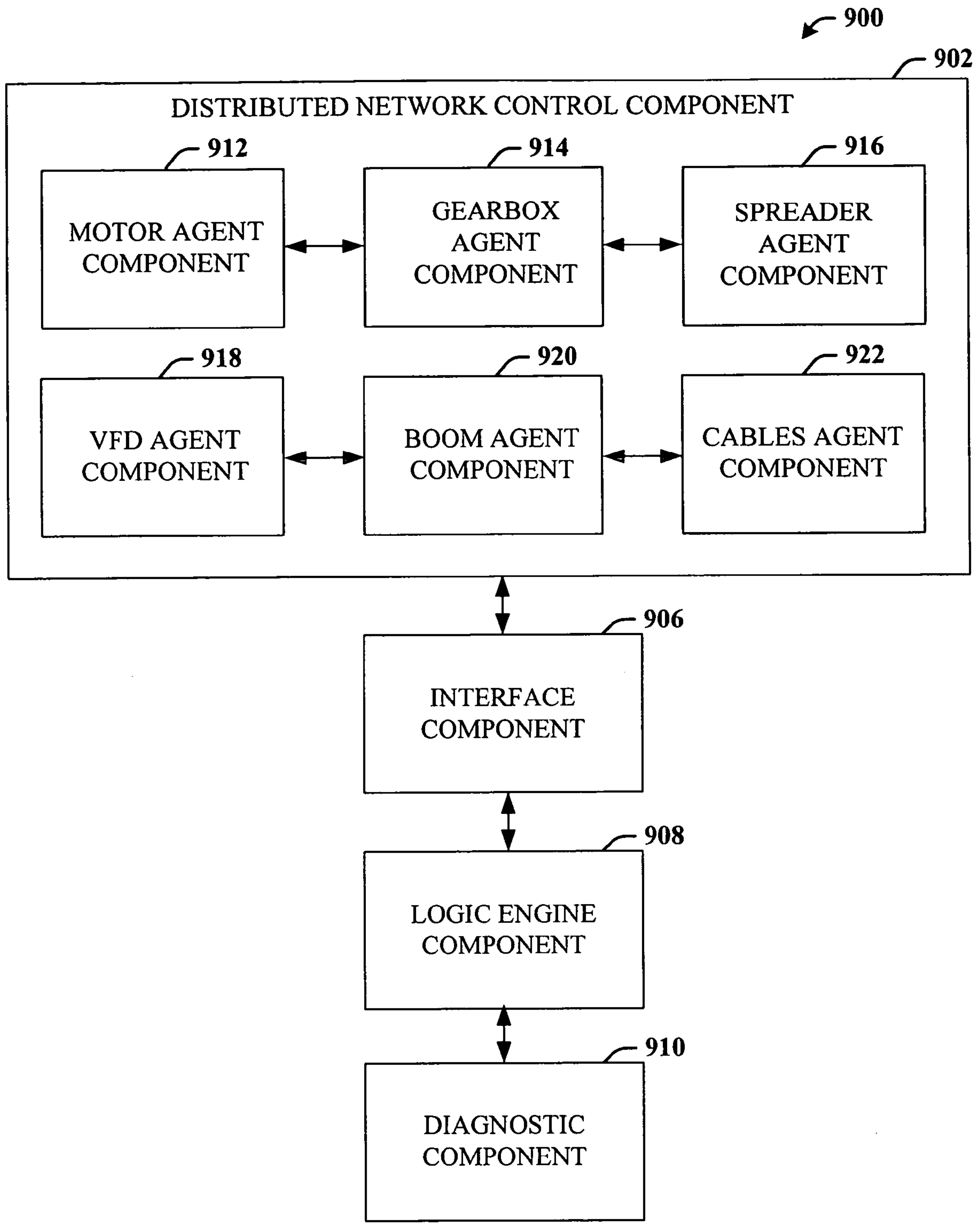
FIG. 9 illustrates a distributed network crane control system.

Referring now to FIG. 9, illustrated is a crane control system 900 utilizing a distributed network control component 902. The crane model utilized for diagnostics, prognostics, and control can be an analytic model as previously described. The crane model can also be a causal model and/or a qualitative model. A causal or qualitative model can describe the crane operation using basic physics or first principles describing in qualitative terms the basic operation of each crane system element and the interaction of the different crane components. This model can provide a framework for diagnosing crane faults and for prescribing and/or initiating crane control commands. Alternatively and/or in addition, the crane system can be modeled using distributed agents. Distributed agents provide a flexible and extensible framework for describing the crane system, how it operates, and can be utilized to diagnose the crane system and perform distributed control.

A representation of an agent-based crane model may associate an autonomous intelligent agent with major components of the crane system such as an intelligent motor agent 912, gearbox agent 914, spreader agent 916, VFD agent 918, boom agent 920, and cable agent 922. Each intelligent agent is capable of performing local reasoning and has local autonomy. Alternatively or in addition, agents 912-922 can communicate with each other and collaborate to identify faults and/or degraded components and to establish a coordinated control action among intelligent agents. The multiple intelligent agents communicate and collaborate to establish an overall best control action and initiate coordinated control of the crane system from multiple autonomous control modules. Multiple agents can reside in a single PLC or computer system. Alternatively and/or in addition, the intelligent agents can be located in distributed computer systems or multiple PLCs. According to another aspect, the agent logic can reside in processors that are integral to or correspond to each agent-based device such as intelligent motors, VFD's, or spreaders. As illustrated, an interface component 906, logic engine component 908, and diagnostic component 910 can be deployed to work with the distributed network control component 902.

The mechanism for communications among the distributed agents can be any of the standard communication methods and can employ any wired or wireless techniques. For instance, in one wired aspect, an Ethernet architecture can be employed. Moreover, in wireless aspects, an IEEE 802.11, Bluetooth™, Infrared (IR), Internet, or the like can be employed. It will be understood that, with respect to the deployment of intelligent agent components, any desired communication and/or collaboration protocol and agent discovery system can be employed. For example, Contract Net, Auction, Market-based Model and Global Resource Locators (e.g., directory facilitators) or the like can be used. By way of further example, operating in accordance with such protocols, the agents can modify their communication, negotiation, and control behavior in ways that can result in a reduction in the number of signals that are sent among agents and enhance control capabilities. This, in turn, can reduce the amount of communication that occurs among the agents and can increase the speed of collaborative decision-making among the agents. Thus, providing improved crane control reliability and more efficient crane operation.

Figure 10:
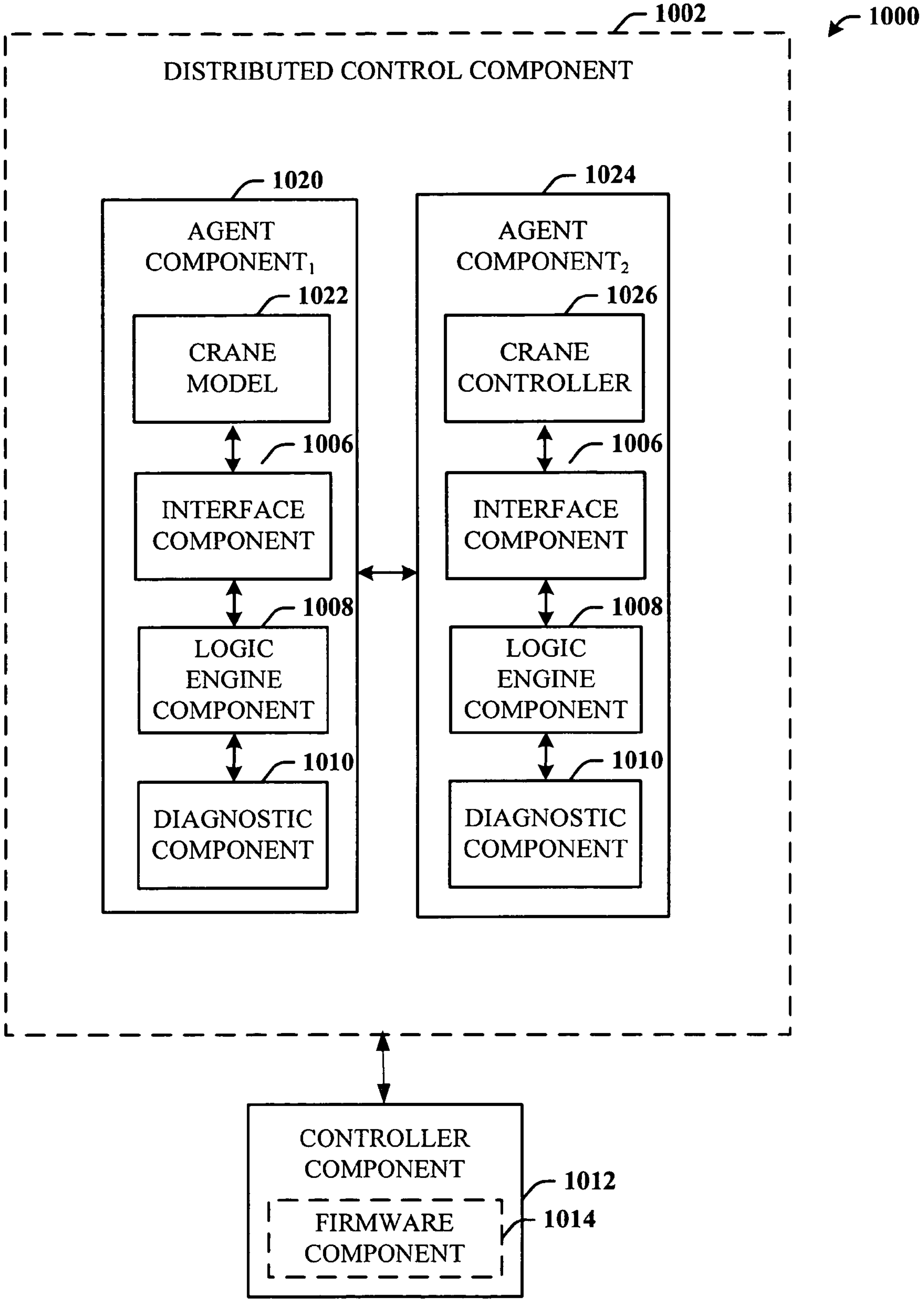
FIG. 10 illustrates a distributed control system that incorporates a crane model and a crane controller.

Referring now to FIG. 10, illustrated is a crane control system 1000 that utilizes a distributed control component 1002. Distributed control component 1002 can include an agent component 1020 that includes a crane model 1022 and an agent component 1024 that includes a crane controller 1026. The agent components 1020 and 1024 have respective interface components 1006, logic engine components 1008, and diagnostic components 1010. The agent components 1020 and 1022 are operative to communicate and/or collaborate with each other and, for example, to control crane sway to reduce container transport time. For example, control strategy can be directed to reduce energy cost, optimize cargo container transit time, avoid machinery failure, etc. A multi-objective function can be specified to simultaneously optimize critical operating parameters and meet essential operational and structural constraints.

Figure 11:
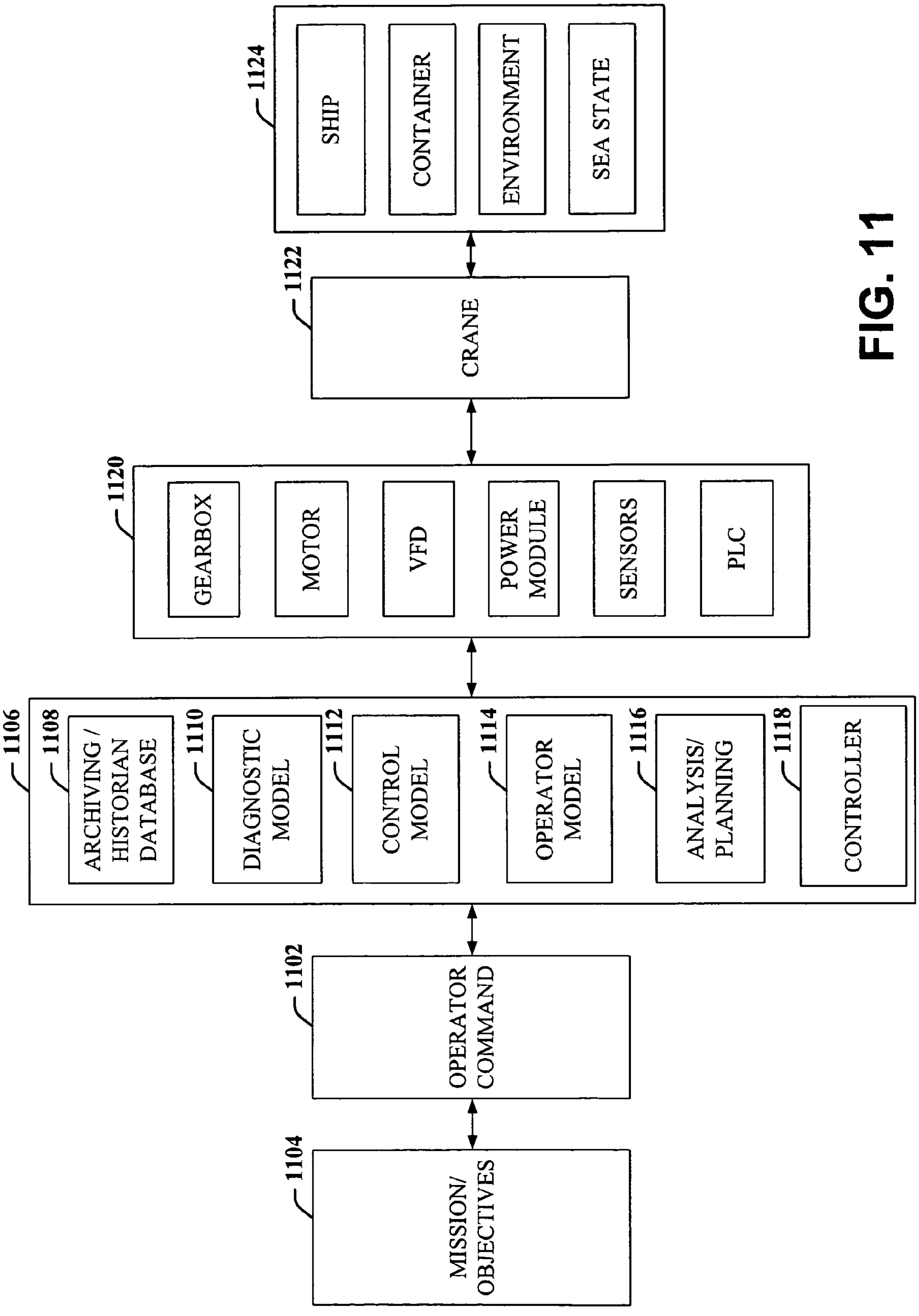
FIG. 11 illustrates a representation of crane system components

With reference now to FIG. 11, illustrated is a representation of crane system components. An operator can specify commands 1102 and/or receive mission(s) and/or objective(s) 1104. For example, a mission and/or objective 1104 can be a prescribed time horizon (e.g., moving one container, moving several containers, move one or more containers over one ship of cargo, moving a specific number of containers during a work shift, . . . ). An objective or optimization criteria can include minimum ship unloading time, minimum energy cost, defer or avoid failure of the crane or other system components whose failure are mitigated as well as other optimization criteria.

The operator commands 1102 and/or mission(s)/objectives(s) 1104 are communicated to model components 1106. The model component(s) 1106 can include an archiving/historian database 1108 that can store historical data relating to an operator, objectives, operating environment, operating conditions, etc. The archiving/historical database 1108 can provide such archiving/historian information to model component(s) 1106.

A diagnostic model 1110 receives operating condition information and performs predictive modeling, based on a current status and stored information from, for example, the archiving/historian database 1108. A control model 1112 can autonomously, or through an operator interface, model crane movement. An operator model 1114 can model operator actions, and based on current and previous actions of the operator can predict, infer and/or recommend an action to control crane sway. An analysis/planning model 1116 can include information regarding the influence of internal and external factors (e.g., container placement, sea state, . . . ). A controller 1118 provides the actual control mechanisms to crane components 1120.

The crane components 1120 can include a gearbox(s), motor(s), vfd(s), power module(s), sensor(s), PLC(s), etc. It is to be understood that each crane component can communicate with the controller 1106 and/or with other crane components. Alternatively, or in addition, each crane component 1120 can be part of a distributed architecture, including distributed agents that communicate and provide for crane 1122 movement. The movement of the crane 1122 is influenced by external conditions 1124 that include ship movements (e.g., speed, position, size, heading, etc.). Other external conditions 1124 that affect the crane and which should be taken into account to control crane sway include the container (e.g., weight, size, shape, . . . ). The operating environment can include conditions such as weather and other external and/or internal factors. A sea state is another external condition 1124 that affects crane sway. The sea state includes tide direction and/or height, as well as other factors relating to the sea. The ship motion, including up to 6-degrees-of-freedom movement, sea state, etc., can be analyzed and/or predicted by any type of intelligence system (e.g., computer-based, black-box sensor-processor system or artificial neural network) to predict the ship motion and/or ship container movement.

Figure 12:
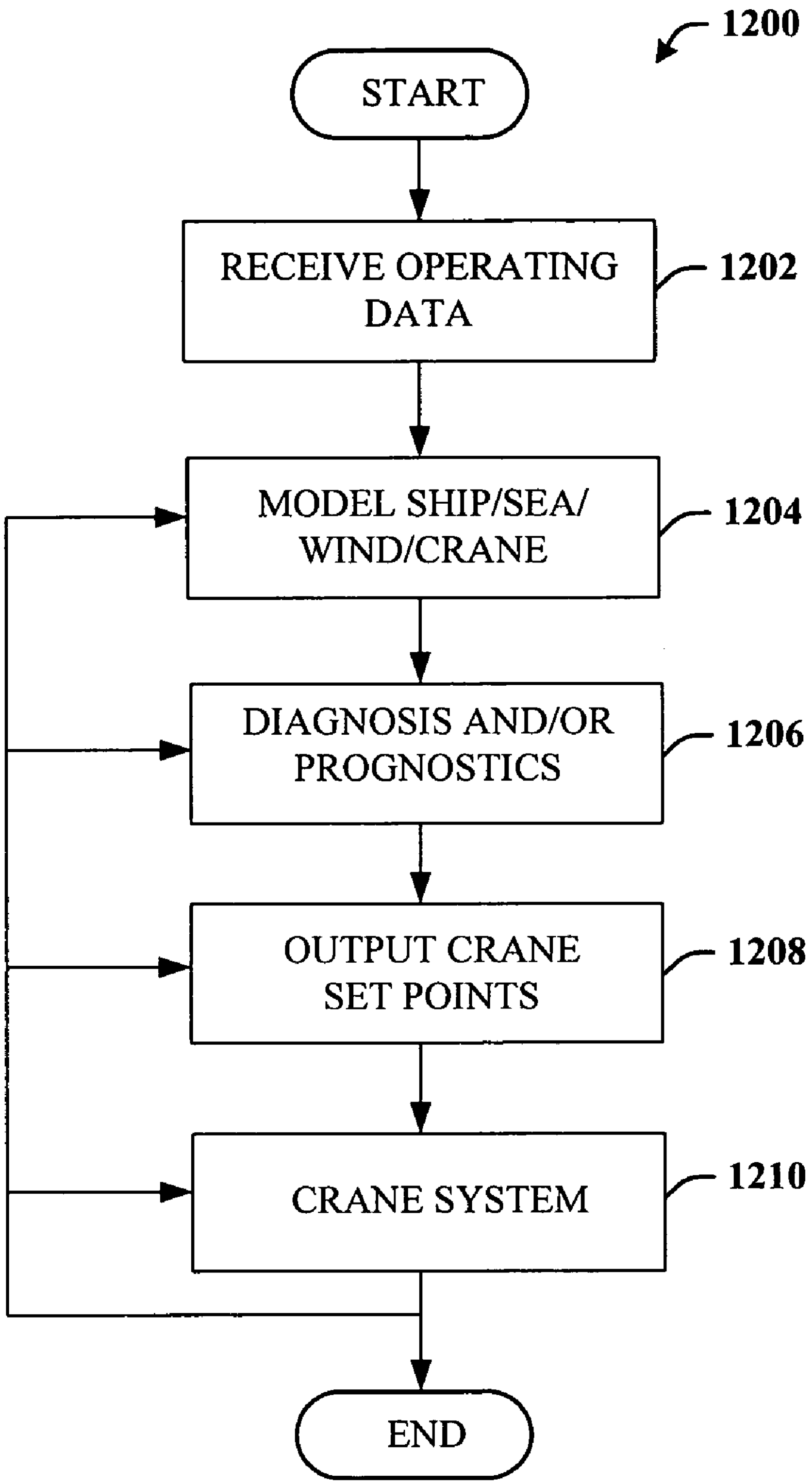
FIG. 12 illustrates a methodology for crane control.
Figure 13:
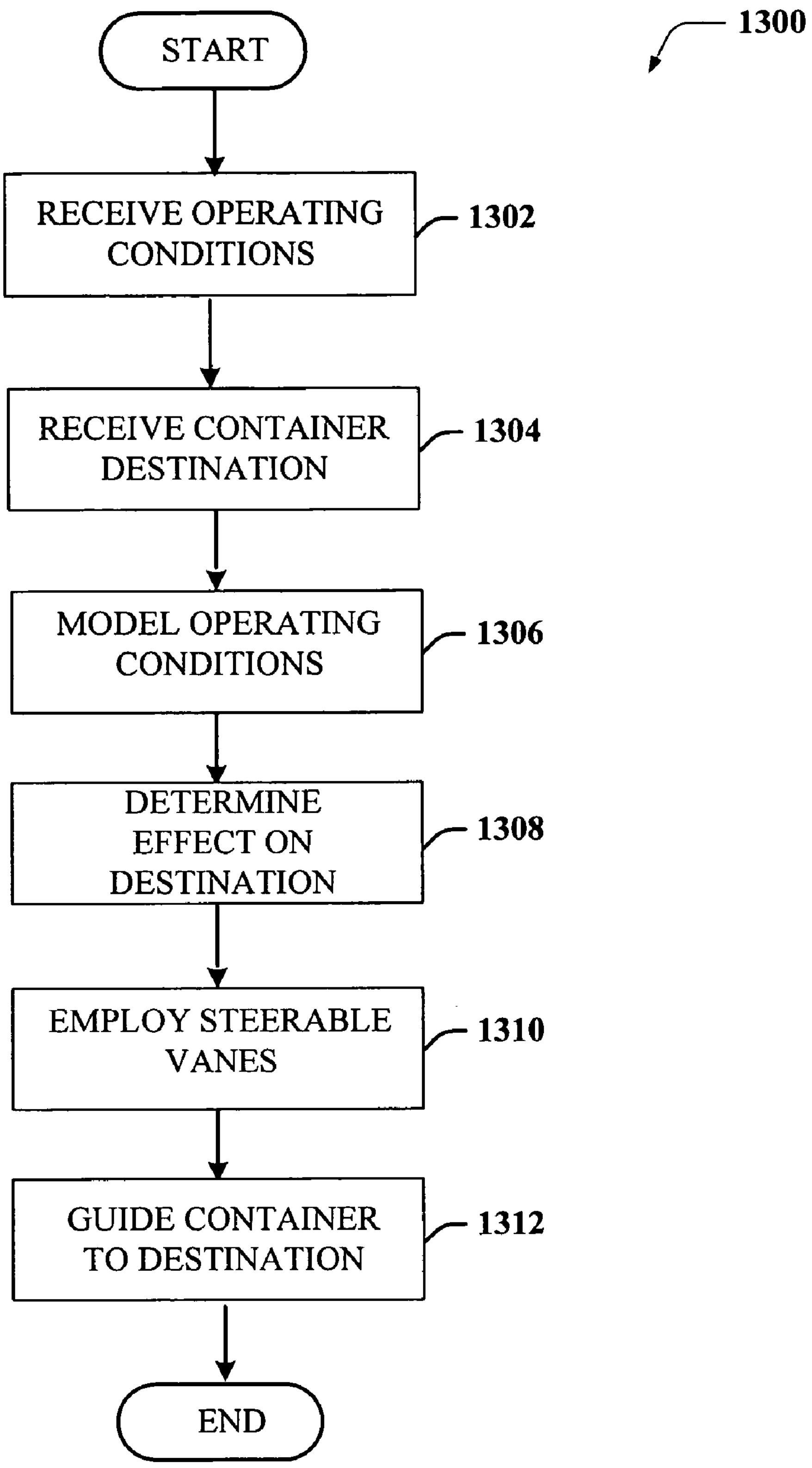
FIG. 13 illustrates a methodology for crane control utilizing steerable vanes.

In view of the exemplary systems shown and described above, methodologies, which may be implemented in accordance with one or more aspects of the invention, will be better appreciated with reference to the diagram of FIGS. 12 and 13. While, for purposes of simplicity of explanation, the methodologies are shown and described as a series of function blocks, it is to be understood and appreciated that the invention is not limited by the order of the blocks, as some blocks may, in accordance with the invention, occur in different orders and/or concurrently with other blocks from that shown and described herein. Moreover, not all illustrated blocks may be required to implement a methodology in accordance with one or more aspects of the invention. It is to be appreciated that the various blocks may be implemented via software, hardware, firmware, a combination thereof or any other suitable means (e.g. device, system, process, component) for carrying out the functionality associated with the blocks. It is also to be appreciated that the blocks are merely to illustrate certain aspects of the invention in a simplified form and that these aspects may be illustrated via a lesser and/or greater number of blocks.

Referring now to FIG. 12, illustrated is a methodology 1200 of anti-sway control and underway replenishment. At 1202, operating information is received. This information can be obtained via sensors, user input, and/or other extrinsic data devices or smart system components. A plurality of elements may contribute to the operating data and the information is not limited to one type of information. At 1204, the data is compiled and modeled by model components that incorporated both 2D modeling and 3D modeling. The model includes predictive analysis of sea and/or wind, the crane, the ship, the operator, and the interaction of these elements and the resulting effect on the ship, crane, and/or container. The result of the modeling is combined with a control objective and at 1206 diagnosis and/or prognostics is performed to anticipate a future action of the crane based upon operator commands, operating conditions, crane movement, predicted operating conditions, predicted sea state, predicted ship motion, etc. Diagnosis and/or prognostic can determine measures or actions that should be taken to counteract undesired motion, including sway requirements (e.g. minimum acceptable sway amount) when a container is placed at a final destination, reduce the probability of failure, minimize energy cost and/or minimize cargo set-down time and/or overall cargo transit time and spreader return time.

The method continues, at 1208, where a crane controller output is communicated to a crane system. The output can be a set point value (or multiple set point values that define an optimal state trajectory) configured to achieve targets and/or objectives. For example, a target and/or objective can be a prescribed time horizon (e.g., moving one container, moving several containers, moving one or more containers over one ship of cargo, moving a specific number of containers during a work shift, . . . ). The crane control may be a multiple-input, multiple-output (MIMO) crane control, such as a state space controller. The controller can be of a class of non-linear controllers including a fuzzy logic controller, artificial neural net (ANN) controller, sliding mode controller, H-infinity controller, and/or model-reference adaptive controller (MRAC), for example.

The output of the crane control can be in the form of advising the operator of recommend actions via a prompt that the operator can implement. It can also be in the form of an action(s) the system automatically implements. In such a way, the crane controller can autonomously control the crane system to achieve the desired actions and/or objections. Alternatively or in addition, the system can dynamically alter the operator's commands within defined limits such as to reduce the controller gains based on operator skill level or structural integrity of the crane system. Alteration of the operator's commands in context with the desired optimal crane operation can serve to effectively enhance the performance of the operation of the crane and provide a training function to less skilled operators.

The crane system movement is provided in the form of feedback to the model component, at 1204, the diagnosis and/or prognostics, at 1206, the crane controller, at 1208, and to the crane system, at 1210. Thus, remedial or other actions taken are continuously monitored and analyzed to predict operating data effects and to eliminate sway during container placement or to induce sway or other actions to reduce transit time or to insure that critical or weakened components do not fail unexpectedly. The feedback results coupled with the control injected into the system and the predicted response from the model can be utilized to automatically adapt and/or train the model to more accurately represent the performance of the crane and/or to more accurately model disturbances such as crane compliance, ship motion, and feedback inaccuracies. This provides a dynamic, adaptive system that results in superior system performance in spite of changes in system operation, equipment condition, operator skill, environmental changes, and/or other unexpected system changes and unmodeled disturbances.

FIG. 13 illustrates a methodology 1300 for moving containers utilizing steerable vanes. At 1302 data regarding operating conditions (internal and/or external) of a crane, including wind direction and speed, is obtained and received by a model component. At 1304, the destination of a spreader or spreader/container is located and received. The destination location may be received from an operator via an input device and/or via sensing means, such as GPS coordinates and/or sensors located on a spreader, ship, container or at divergent locations and/or a data store in memory. The operating conditions and predicted future operating conditions are modeled at 1306 via a model component that models the effect of the wind (as well as other operating conditions) on the spreader and the ultimate destination of the container. For example, the wind may be against the direction in which the container must be moved to its final destination. This information is modeled and at 1308, the effect of the operating condition(s) is modeled to determine if the operating conditions will negatively or positively affect the final location of the container at its destination. This information is evaluated with respect to the crane control capabilities and/or the crane control objectives to determine the optimized control signal. The controller may benefit from the external disturbance on the system and provide improved controller movement by leveraging the external force (e.g. energy) provided. At 1310, an optional signal is sent to steerable vanes located on the spreader to utilize the wind in an effort to move the container to its final destination. For example, the vanes may be utilized to move the spreader in a particular direction with the assistance of the wind or the vanes may be used to act as resistance to the wind effects to dampen sway. By employing the vanes, the container is guided to its ultimate destination and placed in location at 1312. It is to be understood that the steerable vanes can be operated independently of the model-based controller. In such a manner the methodology would start, at 1310, where steerable vanes are employed to control movement of a container.

Figure 14:
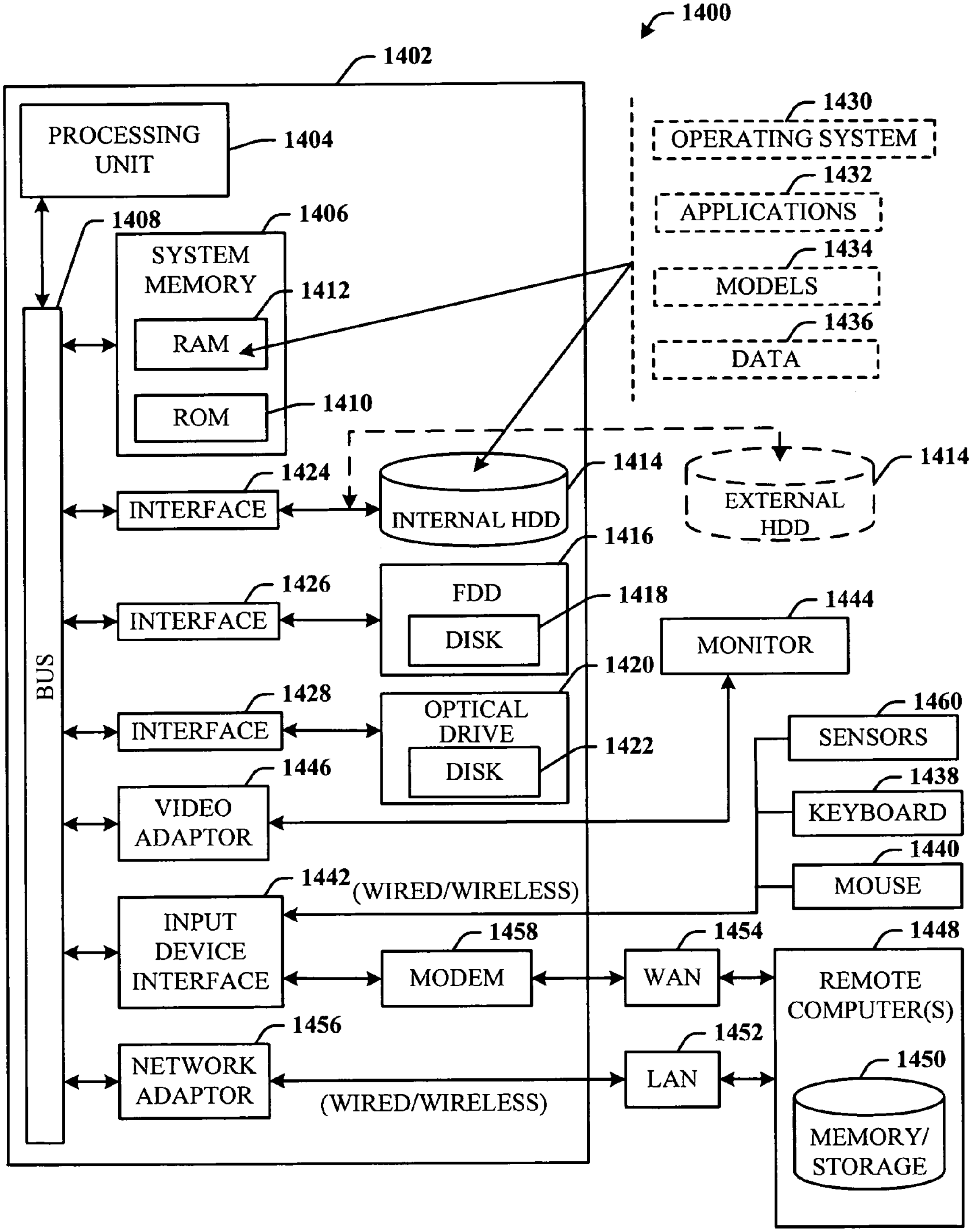
FIG. 14 illustrates a block diagram of a computer operable to execute the system and methods disclosed herein.

Referring now to FIG. 14, illustrated is a block diagram of a computer operable to execute the disclosed architecture. In order to provide additional context for various aspects of the subject invention, FIG. 14 and the following discussion are intended to provide a brief, general description of a suitable computing environment 1400 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive systems and/or methods can be practiced with other computer system configurations, including single-processor or multiprocessor computer systems, minicomputers, mainframe computers, as well as personal computers, hand-held computing devices, microprocessor-based or programmable consumer electronics, single board computers, intelligent machines, distributed PLC's and the like, each of which can be operatively coupled to one or more associated devices. Coupling may be via wired (e.g. networked via Ethernet or DeviceNet) communications or wireless (e.g. RF, Bluetooth™, IEEE 802.15.4, IEEE 802.11b, . . . ).

The illustrated aspects of the invention may also be practiced in distributed computing environments where certain tasks are performed by remote processing devices that are linked through a communications network. In a distributed computing environment, program modules can be located in both local and/or remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, optical, and other wireless media. Combinations of the any of the above should also be included within the scope of computer-readable media.

With reference again to FIG. 14, the exemplary computing environment 1400 for implementing various aspects of the invention includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1412, including an operating system 1430, one or more application programs 1432, system models 1434 and program data 1436. All or portions of the operating system, applications, models, and/or data can also be cached in the RAM 1412. It is appreciated that the invention can be implemented with various commercially available operating systems or combinations of operating systems.

A user can enter commands and information into the computer 1402 through one or more wired/wireless input devices, e.g., a keyboard 1438, a pointing device, such as a mouse 1440. Information can also be received from sensors 1460. Other input devices (not shown) may include a microphone, an IR remote control, a joystick, console buttons or switches, pedals, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, analog to digital (A/D) converters etc.

A monitor 1444 or other type of display device is also connected to the system bus 1408 via an interface, such as a video adapter 1446. In addition to the monitor 1444, a computer typically includes other peripheral output devices (not shown), such as speakers, printers, indicator lights, heads up displays, Augmented Reality goggles, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes any or all of the elements described relative to the computer 1402, although, for purposes of brevity, only a memory storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi, Bluetooth™, IEEE 802.15.4, IEEE 802.11b, and Zigbee™ wireless technologies. Thus, the communication can be a predefined structure as with a conventional network or simply an ad hoc communication between at least two devices.

Wi-Fi, or Wireless Fidelity, allows connection to the Internet from a couch at home, a hotel room, a coffee shop, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices. Each computer connected can serve as the host computer for one or more intelligent agents. The communications mechanism can be utilized to permit the agents to communicate with each other and collaborate to establish crane health, control strategy, reconfiguration plans, and/or control plans. The network can serve to permit implementing both distributed and centralized control and permits remote sensors and actuators that are not directly wired to computer input channels to be accessed.

Figure 15:
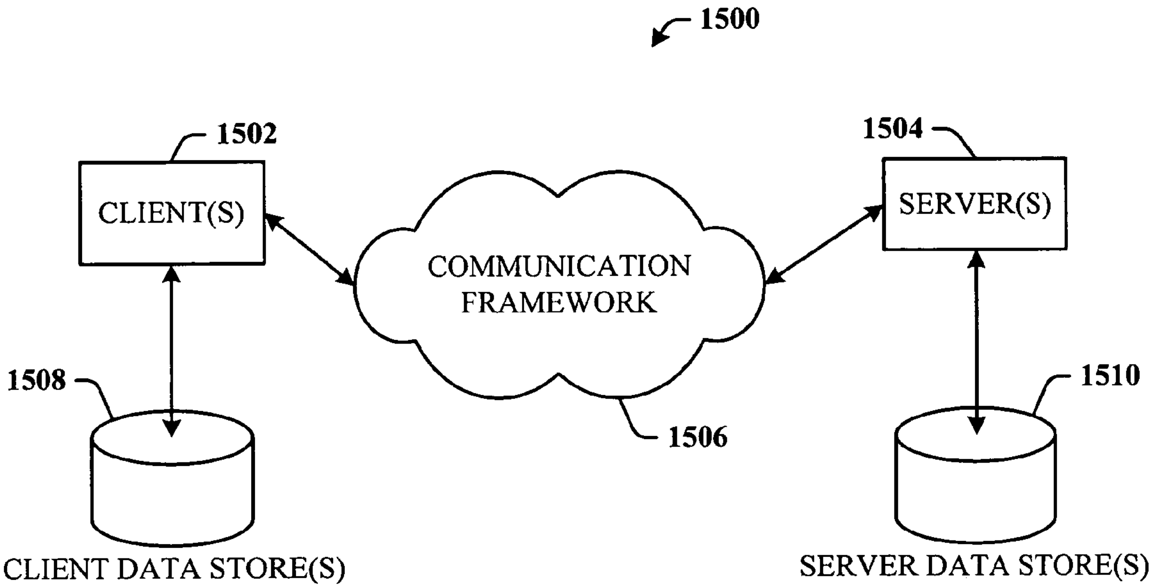
FIG. 15 illustrates a schematic block diagram of an exemplary computing environment in accordance with the subject invention.

Referring now to FIG. 15, illustrated is a schematic block diagram of an exemplary computing environment 1500 in accordance with the subject invention. The system 1500 includes one or more client(s) 1502. The client(s) 1502 can be hardware and/or software (e.g., threads, processes, computing devices). The client(s) 1502 can house cookie(s) and/or associated contextual information by employing the invention, for example.

The system 1500 also includes one or more server(s) 1504. The server(s) 1504 can also be hardware and/or software (e.g., threads, processes, computing devices). The servers 1504 can house threads to perform transformations by employing the invention, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A model-based system that facilitates crane and underway replenishment control, comprising:

a model component that receives a crane operating condition from an extrinsic data analysis component and models crane behavior based at least in part on the crane operating condition; and a component that receives the modeled crane behavior and infers a crane control action based at least in part on the modeled crane behavior.

2. The system of claim 1, the inferred crane control action mitigates sway of a cable or a cargo during at least one of pick-up, set-down and transit.

3. The system of claim 1, the modeled crane behavior is based at least in part upon an optimized crane control over a prescribed time horizon.

4. The system of claim 1, the inferred crane control action is based at least in part upon crane optimization criteria that provides trajectory planning resulting in one of shortest overall container transit time, most energy efficient operation and most reliable operation.

5. The system of claim 1, the component that receives the modeled crane behavior predicts a future operating condition based at least in part on the crane operating condition.

6. The system of claim 1, the model component models crane behavior through utilization of a derived state prediction.

7. The system of claim 1, the extrinsic data analysis component obtains the operating condition from a user input or at least one sensor.

8. The system of claim 1, the component that receives the modeled crane behavior interfaces with a controller component to implement the inferred crane action.

9. The system of claim 1, the component that receives the modeled crane behavior interfaces with at least one steerable spreader vane to mitigate out-of-plane sway.

10. The system of claim 1, further comprising a distributed control architecture that facilitates controlling crane sway utilizing at least two intelligent agents.

11. The system of claim 10, the at least two intelligent agents collaborate to detect or predict a component failure to mitigate the component failure during crane operation.

12. The system of claim 10, the at least two intelligent agents mitigate crane sway during one of pick-up, transit, and set-down.

13. The system of claim 1, further comprising an intelligent motor that infers a potential system failure or degradation and communicates the potential system failure or degradation to a crane controller.

14. The system of claim 1, the model component comprising a ship motion component that monitors up to six degrees-of-freedom movement.

15. The system of claim 1, the model component comprising a sea state component that predicts a sea state.

16. The system of claim 1, the model component comprising a ship motion component that predicts a ship motion.

* * * * *

UNITED STATES PATENT AND TRADEMARK OFFICE

CERTIFICATE OF CORRECTION

PATENT NO. : 7,599,762 B2
APPLICATION NO. : 11/210348
DATED : October 6, 2009
INVENTOR(S) : Discenzo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Twenty-eighth Day of September, 2010

David J. Kappos

*Director of the United States Patent and Trademark Office*